(12) United States Patent
Tezuka et al.

(10) Patent No.: US 9,725,591 B2
(45) Date of Patent: Aug. 8, 2017

(54) REINFORCED RESIN COMPOSITION FOR PLATING BASE, MOLDED ARTICLE, AND ELECTROPLATED COMPONENT

(75) Inventors: Koichi Tezuka, Ube (JP); Iwao Fujimoto, Ube (JP); Emiko Fujimoto, legal representative, Ube (JP); Masahito Nakamoto, Ube (JP)

(73) Assignee: UMG ABS, LTD. (JP)

( * ) Notice: Subject to any disclaimer, the term of this patent is extended or adjusted under 35 U.S.C. 154(b) by 833 days.

(21) Appl. No.: 12/810,409

(22) PCT Filed: Dec. 26, 2008

(86) PCT No.: PCT/JP2008/073758
§ 371 (c)(1),
(2), (4) Date: Jun. 24, 2010

(87) PCT Pub. No.: WO2009/084640
PCT Pub. Date: Jul. 9, 2009

(65) Prior Publication Data
US 2010/0276289 A1 Nov. 4, 2010

(30) Foreign Application Priority Data
Dec. 27, 2007 (JP) ................................ 2007-338094

(51) Int. Cl.
C25D 5/56 (2006.01)
C08L 25/12 (2006.01)
C08L 69/00 (2006.01)
C08L 67/02 (2006.01)
C08L 55/02 (2006.01)
C08L 51/04 (2006.01)
C08L 67/00 (2006.01)
C08L 63/00 (2006.01)

(52) U.S. Cl.
CPC ............. *C08L 67/02* (2013.01); *C08L 25/12* (2013.01); *C08L 55/02* (2013.01); *C08L 69/00* (2013.01); *C25D 5/56* (2013.01); *C08L 51/04* (2013.01); *C08L 63/00* (2013.01); *C08L 67/00* (2013.01); *C08L 2205/03* (2013.01); *C08L 2666/02* (2013.01)

(58) Field of Classification Search
CPC . C25D 5/56; C08L 25/12; C08L 69/00; C08L 67/02; C08L 55/02; C08L 51/04; C08L 2205/03; C08L 67/00; C08L 63/00; C08L 2666/02
USPC ........................................................ 524/127
See application file for complete search history.

(56) References Cited

U.S. PATENT DOCUMENTS

| 5,871,570 A | 2/1999 | Koyama et al. |
| 6,369,142 B1 | 4/2002 | Nodera et al. |
| 7,135,509 B2 | 11/2006 | Ishii et al. |
| 2002/0115789 A1 | 8/2002 | Nodera et al. |
| 2004/0063824 A1* | 4/2004 | Takagi et al. ................. 524/115 |
| 2004/0127611 A1 | 7/2004 | Yamanaka et al. |
| 2004/0152808 A1* | 8/2004 | Tezuka ................... C08F 257/02 524/127 |
| 2010/0273922 A1* | 10/2010 | Fujimoto et al. ............. 524/145 |

FOREIGN PATENT DOCUMENTS

| CN | 1509314 A | 6/2004 |
| CN | 1513028 A | 7/2004 |
| EP | 1408085 A1 | 4/2004 |
| JP | 6049344 A | 2/1994 |
| JP | 8269313 A | 10/1996 |
| JP | 8302177 A | 11/1996 |
| JP | 8319406 A | 12/1996 |
| JP | 10158498 A | 6/1998 |
| JP | 2000103950 A | 4/2000 |
| JP | 2000349486 A | 12/2000 |
| JP | 2001240738 A | 9/2001 |
| JP | 2002047428 A | 2/2002 |
| JP | 2003034749 A | 2/2003 |
| JP | 2003147154 A | 5/2003 |
| JP | 2003327639 A | 11/2003 |
| JP | 2004115605 A | 4/2004 |
| JP | 2004138979 A | 5/2004 |
| JP | 2006063110 A | 3/2006 |

(Continued)

OTHER PUBLICATIONS

Machine Translation of JP 2000-349486, Dec. 15, 2000.*
International Search Report; PCT/JP2008/073758; Mar. 13, 2009; 2 pages.
Official Letter from The Intellectual Property Bureau Ministry of Economic Affairs; Application No. TW 097150941; Issued: Sep. 6, 2012; Mailing Date: Jun. 12, 2012; 8 pages.
Official Letter from The Intellectual Property Bureau Ministry of Economic Affairs; Application No. 097150936; Issued: Jun. 19, 2012; Mailing Date: Sep. 25, 2012; 9 pages.
International Search Report; PCT/JP2008/073755; Mar. 12, 2009; 2 pages.
Official Letter from The Intellectual Property Bureau Ministry of Economic Affairs; Application No. TW 097150941; Issued: Jun. 8, 2012; Mailing Date: Jun. 12, 2012; 8 pages.
Official Letter from The Intellectual Property Bureau Ministry of Economic Affairs; Application No. 097150936; Issued: Jun. 21, 2012; Mailing Date: Jun. 25, 2012; 9 pages.

(Continued)

*Primary Examiner* — Angela C Scott
(74) *Attorney, Agent, or Firm* — St. Onge Steward Johnston & Reens LLC

(57) ABSTRACT

The present invention relates to a reinforced resin composition for plating bases having excellent moldability, mechanical strengths, and plating ability, as well as being capable of improving the surface appearance of the molded article after plating. The reinforced resin composition for plating bases of the present invention includes: graft copolymer (A) in which a graft chain (A2) is grafted to a rubber polymer (A1) a matrix polymer (B) which includes one or more types of polymers selected from the group consisting of a vinyl-based copolymer (B-1), a polycarbonate resin (B-2), and a polyester resin (B-3); an inorganic filler (D); and a glycidyl ether unit-containing polymer (E). The content of the rubber polymer (A1) is from 5 to 25% by mass, relative to 100% by mass of the total amount of the component of (A) and the component of the matrix polymer (B).

9 Claims, No Drawings

(56) References Cited

FOREIGN PATENT DOCUMENTS

| | | | |
|---|---|---|---|
| JP | 2006342196 | A | 12/2006 |
| TW | 200402446 | A | 2/2004 |

OTHER PUBLICATIONS

US Office Action U.S. Appl. No. 12/810,400 Mailing Date: Apr. 24, 2013 8 pages.
Notice of Reasons for Rejection from Japan Application No. 2007-338093 Mailing Date: Feb. 25, 2014 6 pages.
Sun Manling, "Application Principles and Techniques of Epoxy Resin", China Machine Press, Sep. 30, 2002, pp. 32.
Office Action Country: CN Application No. 201510317384.4 Mailing Date: Jun. 17, 2016.

* cited by examiner

REINFORCED RESIN COMPOSITION FOR PLATING BASE, MOLDED ARTICLE, AND ELECTROPLATED COMPONENT

TECHNICAL FIELD

The present invention relates to a reinforced resin composition for plating bases, a molded article, and an electroplated component for use as materials of a housing of a laptop personal computer, a portable device, or the like.

Priority is claimed on Japanese Patent Application No. 2007-338094, filed Dec. 27, 2007, the content of which is incorporated herein by reference.

BACKGROUND ART

Some thermoplastic resin compositions such as flame-retardant ABS and flame-retardant PC/ABS, or reinforced thermoplastic resin compositions for plating bases made by reinforcing such thermoplastic resin compositions with fibers, are used as raw materials of a housing of electronic equipment such as a laptop personal computer and a portable device.

In recent years, a demand for electronic equipment to be thinner and more lightweight is getting stricter, and also a demand to be endurable against impacts and loadings while sitting inside a bag or such a container is being raised. In order to satisfy these demands, the resins used for a housing has to have high rigidity and impact resistance.

However, among conventionally employed housing materials for electronic equipment, non-reinforced flame-retardant ABS resins and flame-retardant PC/ABS resins have low rigidity and thus are not able to meet the recent demand of thickness reduction. In addition, glass fiber-reinforced resin compositions are not sufficient in the balance between the rigidity and the weight.

Furthermore, housings of electronic equipment need to have an electromagnetic interference shielding ability (hereunder, referred to as "EMI shielding ability"). Regarding a method for providing the EMI shielding ability, there is known a method in which a resin containing about 30% by mass or more of a carbon fiber is used.

However, if 30% by mass or more of a carbon fiber is contained, the molded article is likely to have bad appearance and the cost is prone to be incremented. On the other hand, if the content of the carbon fiber is less than 30% by mass, another means for providing sufficient EMI shielding ability has to be taken.

As for a molded article which can achieve lighter weight and reduced thickness as well as exhibiting the EMI shielding ability without impairing the mechanical strengths and the surface appearance, Patent Document 1 proposes a housing having a metal plating layer in a thickness of 5 μm or thicker on the surface of a molded article formed of a thermoplastic resin composition which includes a graft copolymer, a matrix polymer, and an inorganic filler.

In addition, as for a resin material for plating bases, Patent Document 2 proposes a thermoplastic resin composition including a graft copolymer, a matrix polymer, an inorganic filler, and a phosphate ester-based flame-retardant agent.

Patent Document 1: Japanese Laid-Open Patent Application No. 2000-349486

Patent Document 2: Japanese Laid-Open Patent Application Publication No. 2003-147154

DISCLOSURE OF INVENTION

In the thermoplastic resin compositions described in Patent Documents 1 and 2, an inorganic filler is included in order to improve the rigidity. However, the molded article formed from the thermoplastic resin composition described in Patent Document 1 and 2 allows the inorganic filler to protrude on the surface, thus involving a problem in that the appearance of the plated surface is impaired. When the plated surface has bad appearance, the surface after coating the plated surface also has bad appearance. Therefore, the surface has to be smoothened by a polishing treatment with a polishing agent or like treatment, which imposes additional time and labor. In particular, the inorganic filler is likely to protrude on the surface during the plating process because an etching treatment (surface roughening treatment) is applied.

In addition, the thermoplastic resin composition for plating bases is also required to have high moldability.

It is an object of the present invention to provide a reinforced resin composition for plating bases having excellent moldability, mechanical strengths, and plating ability, as well as being capable of improving the surface appearance of the molded article after plating, and to provide a molded article formed of such a resin composition. In addition, it is another object of the present invention to provide an electroplated component having excellent mechanical strengths and surface appearance.

The present invention includes the following aspects.

[1] A reinforced resin composition for plating bases including:

10 to 60% by mass of a graft copolymer (A) in which a graft chain (A2) containing an aromatic alkenyl compound monomer unit (a) and a vinyl cyanide compound monomer unit (b) is grafted to a rubber polymer (A1) having an average particle diameter of 0.1 to 0.6 μm;

40 to 90% by mass of a matrix polymer (B) which includes one or more types of polymers selected from the group consisting of a vinyl-based copolymer (B-1) containing an aromatic alkenyl compound monomer unit (a) and a vinyl cyanide compound monomer unit (b), a polycarbonate resin (B-2), and a polyester resin (B-3) (provided that the total amount of the component (A) and the component (B) accounts for 100% by mass);

0.1 to 60 parts by mass of an inorganic filler (D) relative to 100 parts by mass of the total amount of the graft copolymer (A) and the matrix polymer (B); and 0.5 to 20 parts by mass of a glycidyl ether unit-containing polymer (E) which includes a glycidyl ether unit, wherein the content of the rubber polymer (A1) is from 5 to 25% by mass, provided that the total amount of the graft copolymer (A) and the matrix polymer (B) accounts for 100% by mass.

[2] A reinforced resin composition for plating bases including:

10 to 60% by mass of a graft copolymer (A) in which a graft chain (A2) containing an aromatic alkenyl compound monomer unit (a) and a vinyl cyanide compound monomer unit (b) is grafted to a rubber polymer (A1) having an average particle diameter of 0.1 to 0.6 μm;

40 to 90% by mass of a matrix polymer (B) which includes one or more types of polymers selected from the group consisting of a vinyl-based copolymer (B-1) containing an aromatic alkenyl compound monomer unit (a) and a vinyl cyanide compound monomer unit (b), a polycarbonate resin (B-2), and a polyester resin (B-3) (provided that the total amount of the component (A) and the component (B) accounts for 100% by mass);

0.1 to 60 parts by mass of an inorganic filler (D) relative to 100 parts by mass of the total amount of the graft copolymer (A) and the matrix polymer (B);

0.5 to 20 parts by mass of a glycidyl ether unit-containing polymer (E) which includes a glycidyl ether unit; and 0.1 to 40 parts by mass of a phosphate ester-based flame-retardant agent (F), wherein the content of the rubber polymer (A1) is from 5 to 25% by mass, provided that the total amount of the graft copolymer (A) and the matrix polymer (B) accounts for 100% by mass.

[3] The reinforced resin composition for plating bases according to [2], wherein the molecular weight of the phosphate ester-based flame-retardant agent (F) is higher than 326 and lower than 692.

[4] A reinforced resin composition for plating bases according to any one of [1] to [3], wherein the inorganic filler (D) is a carbon fiber.

[5] A molded article formed through molding processing of the reinforced resin composition for plating bases according to any one of [1] to [4].

[6] An electroplated component including a metal plating layer formed on at least a part of the surface of the molded article according to [5].

[7] The electroplated component according to [6], wherein the thickness of the metal plating layer is 5 μm or thicker.

Effects of the Invention

The reinforced resin composition for plating bases of the present invention has excellent moldability, mechanical strengths, and plating ability, as well as being capable of improving the surface appearance of the molded article after plating.

The molded article of the present invention has excellent mechanical strengths, plating ability, and surface appearance after plating.

The electroplated component of the present invention has excellent mechanical strengths and surface appearance.

BEST MODE FOR CARRYING OUT THE INVENTION

Non-Flame-Retardant Type Reinforced Resin Composition for Plating Bases

A non-flame-retardant type reinforced resin composition for plating bases serving as a first embodiment example of the present invention includes a graft copolymer (A), a matrix polymer (B), an inorganic filler (D), and a glycidyl ether unit-containing polymer (E). In this description, a component including the graft copolymer (A) and the matrix polymer (B) is referred to as a resin main component (C).

(Graft Copolymer (A))

The graft copolymer (A) is made by grafting a graft chain (A2) to a rubber polymer (A1).

[Rubber Polymer (A1)]

Examples of the rubber polymer (A1) can include a butadiene rubber, a styrene-butadiene rubber, an acrylonitrile-butadiene rubber, an isoprene rubber, a chloroprene rubber, a butyl rubber, an ethylene-propylene rubber, an ethylene-propylene-nonconjugated diene rubber, an acrylic rubber, an epichrolohydrin rubber, a diene-acrylic composite rubber, and a silicone (polysiloxane)-acrylic composite rubber. Of these, preferred are a butadiene rubber, a styrene-butadiene rubber, an acrylonitrile-butadiene rubber, an acrylic rubber, a diene-acrylic composite rubber, and a silicone-acrylic composite rubber as they offer excellent plating ability of the molded article formed from the thermoplastic resin composition.

Here, the diene component of the diene-acrylic composite rubber contains butadiene units at 50% by mass or more. Specific examples thereof include a butadiene rubber, a styrene-butadiene rubber, an acrylonitrile-butadiene rubber, or the like.

The acrylic rubber component of the diene-acrylic composite rubber is made by polymerization between an alkyl (meth)acrylate (g) and a polyfunctional monomer (h).

Here, examples of the alkyl (meth)acrylate (g) can include: methyl acrylate, ethyl acrylate, n-propyl acrylate, n-butyl acrylate, 2-ethylhexyl acrylate, and such alkyl acrylates; and hexyl methacrylate, 2-ethylhexyl methacrylate, n-lauryl methacrylate, and such alkyl methacrylates. Either a single kind or a combination of plural kinds of them may be used.

Examples of the polyfunctional monomer (h) can include allyl methacrylate, ethylene glycol dimethacrylate, propylene glycol dimethacrylate, 1,3-butylene glycol dimethacrylate, 1,4-butylene glycol dimethacrylate, triallyl cyanurate, triallyl isocyanurate, or the like. Either a single kind or a combination of plural kinds of them may be used.

The composite structure of the diene-acrylic composite rubber can be exemplified by a core-shell structure in which a core layer of a diene-based rubber is covered by an alkyl (meth)acrylate-based rubber, a core-shell structure in which a core layer of an alkyl (meth)acrylate-based rubber is covered by a diene-based rubber, a structure in which a diene-based rubber and an alkyl (meth)acrylate-based rubber are entangled with each other, a copolymer structure in which diene-based monomer units and alkyl (meth)acrylate-based monomer units are randomly arranged, and the like.

The silicone component of the silicone-acrylic composite rubber is mainly composed of a polyorganosiloxane. Of these, preferred is a polyorganosiloxane containing a vinyl polymerizable functional group. The acrylic rubber component of the silicone-acrylic composite rubber is similar to the acrylic rubber component of the diene-acrylic composite rubber.

The composite structure of the silicone-acrylic composite rubber can be exemplified by a core-shell structure in which a core layer of a polyorganosiloxane rubber is covered by an alkyl(meth)acrylate-based rubber, a core-shell structure in which a core layer of an alkyl(meth)acrylate-based rubber is covered by a polyorganosiloxane rubber, a structure in which a polyorganosiloxane rubber and an alkyl(meth) acrylate-based rubber are entangled with each other, a structure in which polyorganosiloxane segments and polyalkyl (meth)acrylate segments are linearly and sterically bound to each other to form a networked rubber structure, and the like.

The rubber polymer (A1) is prepared by, for example, treating the monomers constituting the rubber polymer (A1) with a radical polymerization initiator to effect emulsion polymerization. The particle diameter of the rubber polymer (A1) can be readily controlled according to the preparation method using emulsion polymerization.

The average particle diameter of the rubber polymer (A1) is from 0.1 to 0.6 μm, preferably not larger than 0.5 μm, and more preferably not larger than 0.4 μm. If the average particle diameter of the rubber polymer (A1) is 0.1 μm or larger, the impact resistance and the plating adhesion strength will be improved. If the average particle diameter is not larger than 0.6 μm, the surface appearance and the plating adhesion strength of the molded article will be improved. For this reason, the composition will be more eligible for use as plating bases.

In addition, the content of the rubber polymer (A1) is from 5 to 25% by mass, and preferably from 7 to 20% by mass, provided that the resin main component (C) accounts for 100% by mass. If the content of the rubber polymer (A1) is 5% by mass or higher, the impact resistance and the plating adhesion strength of the reinforced resin composition for plating bases will be improved. If the content is 25% by mass or lower, the plating adhesion strength will be improved. For this reason, the composition will be more eligible for use as plating bases.

[Graft Chain (A2)]

The graft chain (A2) grafted to the rubber polymer (A1) includes an aromatic alkenyl compound monomer unit (a) and a vinyl cyanide compound monomer unit (b) as essential components, and a monomer unit (c) which is copolymerizable to these components as an optional component. The composition ratio thereof is not specifically limited, although it is preferable such that the aromatic alkenyl compound monomer unit (a) accounts for 50 to 90% by mass, the vinyl cyanide compound monomer unit (b) accounts for 10 to 50% by mass, and the monomer unit (c) accounts for 0 to 40% by mass (provided that the total amount of the component (a), the component (b), and the component (c) accounts for 100% by mass), as such a ratio offers better moldability and plating ability.

Examples of the aromatic alkenyl compound monomer unit (a) can include styrene, u-methylstyrene, vinyltoluene, or the like. Preferred is styrene.

Examples of the vinyl cyanide compound monomer unit (b) can include acrylonitrile, methacrylonitrile, or the like. Preferred is acrylonitrile.

The monomer unit (c) which is copolymerizable to these components can be exemplified by methacrylic acid esters such as methyl methacrylate, ethyl methacrylate, and 2-ethylhexyl methacrylate, acrylic esters such as methyl acrylate, ethyl acrylate, and butyl acrylate, maleimide compounds such as N-phenylmaleimide, and the like.

Moreover, preferably, the graft copolymer (A) contains 70 to 99% by mass of an acetone-insoluble matter, and the reduced viscosity of an acetone-soluble matter is 0.30 to 0.70 dl/g in a 0.2 g/dl N,N-dimethylformamide solution at 25° C. If the acetone-insoluble matter accounts for 70% by mass or more, the appearance of the molded product and the molding processability of the reinforced resin composition for plating bases will be improved. On the other hand, if the acetone-insoluble matter accounts for 99% by mass or less, the tear strength of the reinforced resin composition for plating bases will be improved.

Furthermore, if the reduced viscosity of the acetone-soluble matter in a 0.2 g/dl N,N-dimethylformamide solution at 25° C. is 0.30 dl/g or higher, the tear strength of the reinforced resin composition for plating bases will be improved. If it is 0.70 dl/g or lower, the appearance of the molded product and the molding processability of the reinforced resin composition for plating bases will be more improved.

Here, the acetone-soluble matter is a polymer which is similar to the graft chain (A2) but not grafted to the rubber polymer (A1). This acetone-soluble matter is often generated at the same time when the graft chain (A2) is being grafted to the rubber polymer (A1).

[Production Method of Graft Copolymer (A)]

The graft copolymer (A) is produced by graft-polymerizing the aromatic alkenyl compound monomer (a) and the vinyl cyanide compound monomer (b), and, if necessary, an additional monomer (c), onto the rubber polymer (A1). The production method of the graft copolymer (A) is preferably, but not limited to, emulsion polymerization. In addition, various chain transfer agents may be also added during the graft polymerization, so as to adjust the molecular weight and the graft rate of the graft copolymer (A).

[Blending Amount of Graft Copolymer (A)]

The content of the graft copolymer (A) in the resin main component (C) is from 10 to 60% by mass, and preferably from 15 to 40% by mass (provided that the total amount of the component (A) and the component (B) accounts for 100% by mass). If the content of the graft copolymer (A) is 10% by mass or higher, the impact resistance of the reinforced resin composition for plating bases will be improved. If the content of the graft copolymer (A) is 60% by mass or lower, the molding processability of the reinforced resin composition for plating bases will be improved.

In addition, if the content of the graft copolymer (A) is either 10% by mass or higher, or 60% by mass or lower, the thermal cycle property of the electroplated component formed from the above-mentioned resin composition will be improved. Here, the term "thermal cycle property" refers to a property of restraining the metal plating layer from bulging when the electroplated component is left alternately under a low temperature environment and under a high temperature environment.

(Matrix Polymer (B))

The matrix polymer (B) includes one or more types of polymers selected from the group consisting of a vinyl-based copolymer (B-1), a polycarbonate resin (B-2), and a polyester resin (B-3).

[Vinyl-Based Copolymer (B-1)]

The vinyl-based copolymer (B-1) consists of an aromatic alkenyl compound monomer unit (a) and a vinyl cyanide compound monomer unit (b), and, if necessary, an additional vinyl-based monomer unit (c) which is copolymerizable to them.

Specific examples of the vinyl-based copolymer (B-1) can include a styrene-acrylonitrile copolymer (SAN resin), an α-methylstyrene-acrylonitrile copolymer, a styrene-α-methylstyrene-acrylonitrile copolymer, a styrene-acrylonitrile-methyl methacrylate copolymer, a styrene-acrylonitrile-N-phenylmaleimide copolymer, a styrene-acrylonitrile-maleic anhydride copolymer, or the like.

The content of the aromatic alkenyl compound monomer unit (a) in the vinyl-based copolymer (B-1) is preferably within a range of 50 to 90% by mass, and more preferably within a range of 60 to 80% by mass.

The content of the vinyl cyanide compound monomer unit (b) in the vinyl-based copolymer (B-1) is preferably within a range of 10 to 50% by mass, and more preferably within a range of 20 to 40% by mass.

If the content of the aromatic alkenyl compound monomer unit (a) is 50% by mass or higher, or alternatively, if the content of the vinyl cyanide compound monomer unit is 50% by mass or lower, better moldability will be given.

If the content of the aromatic alkenyl compound monomer unit (a) is 90% by mass or lower, or alternatively, if the content of the vinyl cyanide compound monomer unit is 10% by mass or higher, better plating ability will be given.

In addition, if an additional vinyl-based monomer unit (c) is included, its content is desirably 40% by mass or lower. If the content of the additional vinyl-based monomer unit (c) is 40% by mass or lower, the molding processability and the plating ability of the reinforced resin composition for plating bases will be improved.

The reduced viscosity of the vinyl-based copolymer (B-1) is preferably from 0.4 to 1.4 dl/g when measured in a 0.2 g/dl N,N-dimethylformamide solution at 25° C. If the reduced viscosity of the acetone-soluble matter in a 0.2 g/dl N,N-dimethylformamide solution at 25° C. is 0.4 dl/g or higher, the tear strength of the reinforced resin composition for plating bases will be improved. If it is 1.4 dl/g or lower, the appearance of the molded product and the molding processability of the reinforced resin composition for plating bases will be more improved.

[Polycarbonate Resin (B-2)]

The polycarbonate resin (B-2) is obtained from a dihydroxydiarylalkane, and may be optionally branched.

The polycarbonate resin (B-2) is produced by a known method. For example, this can be produced by reacting a dihydroxy or polyhydroxy compound with phosgene or a carbonate diester.

As for the dihydroxydiarylalkane, for example, a compound having an alkyl group at the ortho position relative to the hydroxy group can be used. Preferred specific examples of the dihydroxydiarylalkane can include 4,4-dihydroxy 2,2-diphenylpropane (that is, bisphenol A), tetramethyl bisphenol A, bis-(4-hydroxyphenyl)-p-diisopropylbenzene, or the like.

Moreover, the branched polycarbonate is produced by, for example, substituting a part, such as 0.2 to 2 mole %, of the dihydroxy compound with polyhydroxy. Specific examples of the polyhydroxy compound can include phloroglucinol, 4,6-dimethyl-2,4,6-tri-(4-hydroxyphenyl)-heptene, 4,6-dimethyl-2,4,6-tri-(4-hydroxyphenyl)-heptane, 1,3,5-tri-(4-hydroxyphenyl)-benzene, or the like.

The viscosity average molecular weight (Mv) of the polycarbonate resin (B-2) is preferably from 15,000 to 35,000. If the viscosity average molecular weight of the polycarbonate resin (B-2) is 15,000 or higher, the impact resistance and the plating adhesion strength of the reinforced resin composition for plating bases will be improved, because of which the composition will be more eligible for plating. In addition, if the viscosity average molecular weight of the polycarbonate resin (B-2) is 35,000 or lower, the moldability of the reinforced resin composition for plating bases will be improved.

In addition, the viscosity average molecular weight (Mv) of the polycarbonate resin (B-2) is preferably from 17,000 to 25,000, as such a range offers a particularly superior balance of the mechanical strengths, the plating ability, and the fluidity.

[Polyester Resin (B-3)]

The polyester resin (B-3) mainly consists of an aromatic dicarboxylic acid unit of 8 to 22 carbon atoms and either an alkylene glycol unit of 2 to 22 carbon atoms or a cycloalkylene glycol unit, wherein the total amount of these component units accounts for 50% by mass or higher. In addition, the polyester resin (B-3) may also contain, if necessary, an aliphatic dicarboxylic acid such as adipic acid and sebacic acid, or a polyalkylene glycol such as polyethylene glycol and polytetramethylene glycol, as a component unit.

Preferred examples of the polyester resin (B-3) can include polyethylene terephthalate, polybutylene terephthalate, polytetramethylene terephthalate, polybutylene naphthalate, or the like. Either a single kind or a combination of plural kinds of these polyester resins may be used.

[Composition of Matrix Polymer (B)]

The matrix polymer (B) may include either a single kind or a combination of plural kinds of the vinyl-based copolymer (B-1), the polycarbonate resin (B-2), and the polyester resin (B-3). Examples thereof can include: combinations of two kinds of polymers such as a combination of the SAN resin (B-1) and the polycarbonate resin (B-2), a combination of the SAN resin (B-1) and the polyester resin (B-3), and a combination of the polycarbonate resin (B-2) and the polyester resin (B-3); and combinations of three kinds of polymers such as a combination of the SAN resin (B-1), the polycarbonate resin (B-2), and the polyester resin (B-3). Of these, preferred are: the combination of the SAN resin (B-1) and the polycarbonate resin (B-2); and the combination of the SAN resin (B-1), the polycarbonate resin (B-2), and the polyester resin (B-3), as such a combination offers an excellent balance of the moldability and the impact resistance.

The content of the matrix polymer (B) in the resin main component (C) is from 40 to 90% by mass, and preferably from 60 to 85% by mass (provided that the total amount of the component (A) and the component (B) accounts for 100% by mass). If the content of the matrix polymer (B) is 40% by mass or higher, the impact resistance of the reinforced resin composition for plating bases will be improved. If the content of the matrix polymer (B) is 90% by mass or lower, the molding processability of the reinforced resin composition for plating bases will be improved.

In addition, if the content of the matrix polymer (B) is 40% by mass or higher, or 90% by mass or lower, the thermal cycle property of the electroplated component formed from the above-mentioned resin composition will be improved. Even if the matrix polymer (B) includes a combination of plural kinds of polymers, the content of the matrix polymer (B) in the resin main component (C) is from 40 to 90% by mass (provided that the total amount of the component (A) and the component (B) accounts for 100% by mass).

If the matrix polymer (B) includes a combination of plural kinds of polymers, the vinyl-based copolymer (B-1), the polycarbonate resin (B-2), and the polyester resin (B-3) are preferably within the following composition ratio.

If the matrix polymer (B) includes the combination of the SAN resin (B-1) and the polycarbonate resin (B-2), it is preferable that the SAN resin (B-1) accounts for 1 to 65% by mass and the polycarbonate resin (B-2) accounts for 35 to 99% by mass (provided that the total amount of the component (B-1) and the component (B-2) accounts for 100% by mass).

If the matrix polymer (B) includes the combination of the SAN resin (B-1), the polycarbonate resin (B-2), and the polyester resin (B-3), it is preferable that the SAN resin (B-1) accounts for 1 to 69% by mass, the polycarbonate resin (B-2) accounts for 30 to 98% by mass, and the polyester resin (B-3) accounts for 1 to 69% by mass (provided that the total amount of the component (B-1), the component (B-2), and the component (B-3) accounts for 100% by mass).

The respective components within such a range offer a better balance of the molding processability, the mechanical strengths, and the plating ability of the reinforced resin composition for plating bases.

(Inorganic Filler (D))

Examples of the inorganic filler (D) can include inorganic fibers such as glass fibers and carbon fibers, metal-coated inorganic fibers, wollastonite, talc, mica, glass flakes, glass beads, potassium titanate, calcium carbonate, magnesium carbonate, carbon black, Ketjen Black, and such inorganic substances, iron, copper, zinc, aluminum, and such metals, alloys, and oxides thereof in forms of fibers and powders. Of these, carbon fibers are preferred since even a small content thereof can offer high rigidity.

Either a single kind or a combination of plural kinds of these inorganic fillers may be used.

The surface of the inorganic filler (D) may be treated with a finishing agent such as a coupling agent (for example, a silane-based coupling agent and a titanate-based coupling agent).

In addition, the glass fibers or the carbon fibers may be bundled or coated with an ethylene-vinyl acetate copolymer or such a thermoplastic resin, a polyurethane resin, an epoxy resin or such a thermosetting resin.

The content of the inorganic filler (D) is from 0.1 to 50 parts by mass and preferably from 5 to 30 parts by mass, relative to 100 parts by mass of the resin main component (C). If the content of the inorganic filler (D) is 0.1 part by mass or higher, the rigidity and such properties can be sufficiently improved. If the content of the inorganic filler (D) is 50 parts by mass or lower, better moldability will be given.

(Glycidyl Ether Unit-Containing Polymer (E))

The glycidyl ether unit-containing polymer (E) is a polymer having a glycidyl ether unit.

Examples of the glycidyl ether unit-containing polymer (E) can include glycidyl ether type epoxy resins yielded by a reaction between a compound having a hydroxy group and epichlorohydrin.

The glycidyl ether type epoxy resin can be exemplified by high molecular weight substances such as bisphenol type epoxy resins, novolac type epoxy resins, polyglycidyl ethers of aliphatic polyhydric alcohols, and biphenyl type epoxy resins, which have a polymer of repetitive units represented by the following formula (1) (for example, an epoxy group-containing phenoxy resin).

Furthermore, the bisphenol type epoxy resins can be exemplified by a bisphenol A type epoxy resin, a bisphenol F type epoxy resin, a bisphenol AD type epoxy resin, and an epoxy resin having structures of both bisphenol A and bisphenol F.

The novolac type epoxy resins can be exemplified by a phenol novolac type epoxy resin and a cresol novolac type epoxy resin.

The polyglycidyl ethers of aliphatic polyhydric alcohols can be exemplified by alkylene glycol diglycidyl ether (such as ethylene glycol diglycidyl ether), polyoxyalkylene glycol diglycidyl ether (such as diethylene glycol diglycidyl ether, polyethylene glycol diglycidyl ether, dipropylene glycol diglycidyl ether, tripropylene glycol diglycidyl ether, and polypropylene glycol diglycidyl ether), and glycerine triglycidyl ether.

Either a single kind or a combination of plural kinds of these glycidyl ether type epoxy resins may be used.

[Chemical Formula 1]

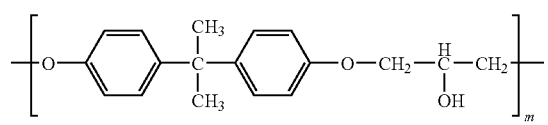

(1)

Here, the symbol m represents an integer of 1 or greater.

Preferred glycidyl ether unit-containing polymers (E) are a bisphenol A type epoxy resin, a bisphenol F type epoxy resin, an epoxy resin having structures of both bisphenol A and bisphenol F, a phenol novolac type epoxy resin, a cresol novolac type epoxy resin, and an epoxy group-containing phenoxy resin. Using such a preferred polymer, the impact resistance and the plating ability will be more improved.

The glycidyl ether unit-containing polymer (E) may be in any state among a liquid state, a semisolid state, and a solid state, at normal temperature (20° C.), although the solid state is preferred considering the operability for the extrusion process.

The mass average molecular weight of the glycidyl ether unit-containing polymer (E) is preferably from 300 to 200,000, more preferably from 900 to 60,000, and particularly preferably from 1,000 to 55,000. If the mass average molecular weight of the glycidyl ether unit-containing polymer (E) is 300 or higher, the thermal resistance will be improved. If the mass average molecular weight of the glycidyl ether unit-containing polymer (E) is 200,000 or lower, the moldability will be improved.

The glycidyl ether unit-containing polymer (E) is commercially available. Examples of such a commercial product can include "jER" series manufactured by Japan Epoxy Resins Co., Ltd., "Epototo" series and "Phenototo" series manufactured by Tohto Kasei Co., Ltd., "AER" series manufactured by Asahi Kasei Chemicals Corporation, and "Epiclon" series manufactured by Dainippon Ink and Chemicals, Incorporated.

The content of the glycidyl ether unit-containing polymer (E) is from 0.5 to 20 parts by mass, preferably from 2 to 12 parts by mass, and more preferably from 3 to 9 parts by mass, relative to 100 parts by mass of the resin main component (C). If the content of the glycidyl ether unit-containing polymer (E) is 0.5 parts by mass or higher, the appearance of the plated surface will be improved. If the content of the glycidyl ether unit-containing polymer (E) is 20 parts by mass or lower, the thermal cycle property of the electroplated component will be improved.

(Other Components)

The reinforced resin composition for plating bases can also appropriately include another modifier, a mold releasing agent, a light or thermal stabilizer, an antistatic agent, a dye, a pigment, or the like, if necessary.

(Production Method)

The reinforced resin composition for plating bases is produced by mixing the graft copolymer (A), the matrix polymer (B), the inorganic filler (D), and the glycidyl ether unit-containing polymer (E) mentioned above. The mixture may also be additionally kneaded by a kneading device (such as a single screw extruder, a twin screw extruder, a banbury mixer, and a ko-kneader).

Flame-Retardant Type Reinforced Resin Composition for Plating Bases

A flame-retardant type reinforced resin composition for plating bases serving as a second embodiment example of the present invention includes a graft copolymer (A), a matrix polymer (B), an inorganic filler (D), a glycidyl ether unit-containing polymer (E), and a phosphate ester-based flame-retardant agent (F).

The graft copolymer (A), the matrix polymer (B), the inorganic filler (D), and the glycidyl ether unit-containing polymer (E) in this embodiment example have the same meanings as those of the graft copolymer (A), the matrix polymer (B), the inorganic filler (D), and the glycidyl ether unit-containing polymer (E) in the first embodiment example mentioned above.

(Phosphate Ester-Based Flame-Retardant Agent (F))

The phosphate ester-based flame-retardant agent is a compound represented by the following formula (2).

[Chemical Formula 2]

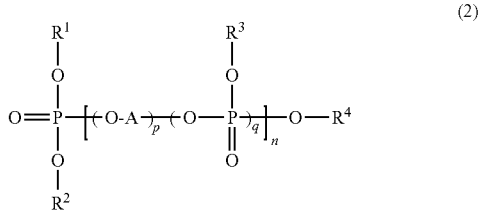

(2)

Here, $R^1$, $R^2$, $R^3$, and $R^4$ represent, each independently, a hydrogen atom or an organic group, provided that not all the $R^1$, $R^2$, $R^3$, and $R^4$ are hydrogen atoms.

The symbol A represents a divalent or higher organic group, the symbol p represents 0 or 1, the symbol q represents an integer of 1 or greater, and the symbol n represents an integer of 0 or greater.

Examples of the organic group can include substitutable alkyl groups (such as a methyl group, an ethyl group, a butyl group, and an octyl group), cycloalkyl groups (such as a cyclohexyl group), and aryl groups (such as a phenyl group and alkyl group-substituted phenyl groups). In addition, the number of substituent groups, if any, is not limited. The substituted organic group can be exemplified by an alkoxy group, an alkyl-thio group, an aryloxy group, and an arylthio group. Moreover, the organic group may be a group in which these substituent groups are combined with each other (such as an arylalkoxylalkyl group) or a group in which these substituent groups are combined by bonding through an oxygen atom, a nitrogen atom, a sulfur atom, or the like (such as an arylsulfonyl aryl group).

In addition, the term "divalent or higher organic group" refers to a divalent or higher functional group obtained by removing two or more hydrogen atoms binding to carbon atom(s) in the above-mentioned organic group. Examples thereof can include an alkylene group and a (substituted) phenylene group. The hydrogen atoms to be removed from the carbon atom(s) can be selected at discretion.

Specific examples of the phosphate ester-based flame-retardant agent (F) can include trimethyl phosphate, triethyl phosphate, tributyl phosphate, trioctyl phosphate, tributoxyethyl phosphate, triphenyl phosphate, tricresyl phosphate, trixylyl phosphate, cresyl diphenyl phosphate, xylyl diphenyl phosphate, octyl diphenyl phosphate, diphenyl-2-ethylcresyl phosphate, tris(isopropylphenyl) phosphate, and resorcinyl diphenyl phosphate.

In addition, polyphosphates such as bisphenol A-bis(dicresyl phosphate), phenylene bis(diphenyl phosphate), phenylene bis(ditolyl phosphate), and phenylene bis(dixylyl phosphate), which are exemplified by bisphenol A bisphosphates, hydroquinone bisphosphates, resorcin bisphosphates, trioxybenzene triphosphates, can also be included.

Either a single kind or a combination of plural kinds of these phosphate ester-based flame-retardant agents (F) may be used.

Of the above specific examples, preferred examples of the phosphate ester-based flame-retardant agent (F) are trixylyl phosphate, phenylene bis(diphenyl phosphate), phenylene bis(dixylyl phosphate), phenylene bis(ditolyl phosphate), and bisphenol A-bis(dicresyl phosphate), and more preferred are phenylene bis(diphenyl phosphate) and phenylene bis (dixylyl phosphate).

The polyphosphate of the phosphate ester-based flame-retardant agent (F) can be obtained by, for example, dehydration-condensation between an orthophosphoric acid and a diol of any various kinds such as polynuclear phenols (for example, bisphenol A). Examples of such a diol can include hydroquinone, resorcinol, diphenylolmethane, diphenyloldimethylmethane, dihydroxybiphenyl, p,p'-dihydroxy diphenyl sulfone, dihydroxynaphthalene, or the like.

The molecular weight of the phosphate ester-based flame-retardant agent (F) is higher than 326, and preferably 550 or higher. With the phosphate ester-based flame-retardant agent having a molecular weight of higher than 326, the moldability will be improved, the gas emission during the molding process will be reduced, and a molded article having excellent appearance can be obtained.

In addition, the upper limit of the molecular weight of the phosphate ester-based flame-retardant agent is preferably lower than 692, and more preferably 686 or lower, in terms of the flame retardancy of the resultant reinforced resin composition for plating bases.

The phosphate ester-based flame-retardant agent (F) is commercially available. Examples of such a commercial product can include "FP" series manufactured by ADEKA Corporation, "Kronitex" series manufactured by Ajinomoto Fine-Techno Co., Inc., "Reofos" series manufactured by Chemtura Japan Limited, "CR" series and "PX" series manufactured by Daihachi Chemical Industry Co. Ltd.

The content of the phosphate ester-based flame-retardant agent (F) is from 0.1 to 40 parts by mass, and preferably from 0.1 to 35 parts by mass, relative to 100 parts by mass of the resin main component (C). If the content of the phosphate ester-based flame-retardant agent (F) is 0.1 part by mass or higher, flame retardancy will be given. If the content of the phosphate ester-based flame-retardant agent (F) is 40 parts by mass or lower, thermal resistance will be given and burning drips will be hardly generated upon burning.

The flame-retardant type reinforced resin composition for plating bases may also contain a known non-halogen flame-retardant agent, in addition to the phosphate ester-based flame-retardant agent (F) so that the both agents can be used in combination. Examples of the non-halogen flame-retardant agent can include inorganic flame-retardant agents such as red phosphorus and aluminum hydroxide.

The red phosphorus-based flame-retardant agent can be used after stabilization by coating with a thermosetting resin either with or without metal hydroxide. Since the red phosphorus-based flame-retardant agent is flammable by its own, it may be mixed with the matrix polymer (B) or at least a part of the resin main component (C) in a form of a master batch.
(Flame-Retardant Auxiliary Agent)

Moreover, the flame-retardant type reinforced resin composition for plating bases may also contain a flame-retardant auxiliary agent for preventing drips upon burning. Examples of the flame-retardant auxiliary agent can include polytetrafluoroethylene, tetrafluoroethylene-containing compounds, and silicone-based polymers.

If polytetrafluoroethylene or a tetrafluoroethylene-containing compound is contained as the flame-retardant auxiliary agent, the content thereof is preferably 0.5 parts by mass or lower, relative to 100 parts by mass of the resin main component (C), from the point of the appearance of the molded product.
(Composition)

The contents of the graft copolymer (A), the matrix polymer (B), the inorganic filler (D), and the glycidyl ether unit-containing polymer (E) in the flame-retardant type reinforced resin composition for plating bases are the same as those of the first embodiment example.

(Operation and Effect)

The above-mentioned reinforced resin composition for plating bases including the graft copolymer (A), the matrix polymer (B), the inorganic filler (D), and the glycidyl ether unit-containing polymer (E) has high moldability and mechanical strengths. Moreover, bulging of the metal plating layer hardly occurs when the molded article formed from the resin composition is plated. In addition, the adhesion strength of the metal plating layer is high. Furthermore, these properties can be maintained even if the environmental temperature is changed. Therefore, the plating ability is high.

According to the above-mentioned resin composition, the yielded molded article will have less unfavorable situations of the appearance caused by protrusion of the inorganic filler, and roughness and scratchiness caused by projections on the surface. Accordingly, the surface appearance of the molded article after plating can be improved.

In addition, the reinforced resin composition for plating bases of the second embodiment example is given the flame retardancy without adding chlorine, bromine, and such halogen, and thus is conformable to the German and Swedish eco labels, and the like.

Molded Article

The molded article of the present invention is formed through molding processing of the above-mentioned reinforced resin composition for plating bases.

The molding processing method of the reinforced resin composition for plating bases can be exemplified by injection molding, injection compression molding, extrusion, blow molding, vacuum molding, air-pressure molding, calendar molding, and inflation molding. Of these, injection molding and injection compression molding are preferred as they excel in the mass productivity and enable to yield molded articles of highly precise dimensions.

The average thickness of the molded article varies depending on the application and the shape, although it is usually from 0.3 to 5.0 mm. Regarding housings of portable devices, which are required to be thinner and more lightweight, the thickness is from 0.5 to 1.5 mm.

Electroplating Component

The electroplated component of the present invention has a metal plating layer formed on at least a part of the surface of the above-mentioned molded article. Here, the metal constituent of the metal plating layer can be exemplified by copper, nickel, cobalt, chromium, silver, gold, and the like. Either a single kind or plural kinds of metals may be used.

The metal plating layer may take either a single layer structure or a multilayer structure formed of a plurality of layers. In addition, the metal plating layer having a multilayer structure is neither limited to the types and the combination of metals of the respective layers, nor limited to the thicknesses of the respective layers.

Moreover, a coating may be applied on the surface of the metal plating layer, if necessary.

The thickness of the metal plating layer is preferably 5 μm or thicker as such a thickness leads to higher rigidity of the electroplated component.

In addition, the thickness of the metal plating layer is preferably 50 μm or thinner in terms of the balance of the rigidity and the product weight of the yielded electroplated component, and the production cost.

The metal plating layer may cover a part of, or the entire surface of the molded article. In order to sufficiently improve the EMI shielding ability, the bend elastic constant, the rigidity, and the impact resistance of the electroplated component, it is preferable that the metal plating layer covers the entire surface (including non-effective surface), or 90% or more of the entire surface (including non-effective surface), of the molded article.

If metal plating layers are formed on both the internal side and the external side of the molded article, it is preferable to set the difference in the thickness between the metal plating layer on the internal side and the metal plating layer on the external side at 20% or less. If the thickness difference is 20% or less, the tensile stresses occurring upon the deposition of the metal plating layers on the internal and external surfaces of the molded article can be readily equalized, as a result of which unfavorable situations caused by distortion of the molded article or accumulation of stresses will occur less.

The production method of the electroplated component can be exemplified by a method in which a molded article is subjected to a surface roughening treatment, if necessary, then to an electroconductive treatment, and subsequently to an electroplating treatment.

The surface roughening treatment is performed so as to prevent inferior separation of the metal plating layer from the molded article. For example, if the matrix polymer (B) included in the reinforced resin composition for plating bases contains the vinyl-based copolymer (B-1), a treatment to dip the molded article in a mixture solution of chromic acid and sulfuric acid can be applied as the surface roughening treatment.

The electroconductive treatment is a treatment to render the molded article electrically conductive so as to enable an electroplating treatment. Examples thereof can include a method in which an electroless plating treatment is performed to form a conductive electroless plating layer on the surface of the molded article.

To form an electroless plating layer, there can be applied a method in which the surface of the molded article is provided with a metal having a catalytic action, such as palladium, by subjecting the molded article, no matter whether its surface is roughened or not, to a treatment such as dipping in a tin-palladium solution or sputtering with palladium metal.

In the method of dipping in a tin-palladium solution, if the vinyl-based copolymer (B-1) is contained, it is possible to carry out electroless plating since the vinyl cyanide monomer unit is contained and tin-palladium is directly adsorbed thereto. Otherwise, a treatment with a surfactant, kneading with a resin having the other polarity, or coating on the surface of the molded article, has to be carried out to adsorb tin-palladium.

Another method of depositing an electroless plating layer can be exemplified by a method of coating a solution containing fine metal particles of nickel, or the like, and depositing an electroless plating layer using these nickel particles or the like as catalytic nuclei. The metal type of the electroless plating can be exemplified by copper, nickel, silver, and the like.

In addition, other electroconductive treatments can be exemplified by a method of kneading the reinforced resin composition for plating bases with carbon black, carbon fibers, metal powder, metal fibers, or a material made by plating on carbon fibers or such fibers or cloth, a method of coating a conductive coating material, and a method of depositing a metal by sputtering or vacuum evaporation.

The above-mentioned electroplated component of the present invention excels in the rigidity, mechanical strengths such as the impact resistance, and the surface appearance. In addition, the electroplated component of the present invention also excels in the EMI shielding ability since it has metal plating layer(s).

The electroplated component of the present invention can be applied to, for example: housings of a personal computer (including a laptop type), a projector (including a liquid crystal projector), a television set, a printer, a fax machine, a copying machine, audio equipment, a game machine, a camera (including a video camera, a digital camera, and the like), filming equipment such as video equipment, musical instruments, a portable device (such as an electronic diary and a personal digital assistant (PDA)), lighting equipment, and a communication device such as a telephone (including a mobile phone); fishing goods; play equipment such as pinball goods; products for vehicles; products for furniture; products for sanitation; and products for building materials. Of these applications, suitable application is a housing of an electronic part of a laptop personal computer, a portable device, or the like because the effects of the present invention can be especially exploited.

EXAMPLES

Hereunder, specific examples are shown. The present invention is not to be limited to these examples. In addition, the following denotations of "part" and "%" respectively refer to "part by mass" and "% by mass".

[Preparation of Graft Copolymer (A-1)]

To 100 parts (in terms of solid content) of a polybutadiene latex having an average particle diameter of 0.08 μm at a solid content concentration of 35% was added 2 parts (in terms of solid content) of a copolymer latex having an average particle diameter of 0.08 μm consisting of 85% of an n-butyl acrylate unit and 15% of a methacrylic acid unit 15% under stirring. Next, the mixture was kept stirred for 30 minutes, thereby yielding an enlarged butadiene-based rubber polymer latex having an average particle diameter of 0.28 μm.

The yielded enlarged butadiene-based rubber polymer latex was placed in a reactor vessel, to which 100 parts of distilled water, 4 parts of a wood rosin emulsifier, 0.4 parts of Demol N (product name of naphthalene sulfonate formaldehyde condensate manufactured by Kao Chemicals), 0.04 parts of sodium hydroxide, and 0.7 parts of dextrose were further added. Next, the mixture was heated under stirring. When the internal temperature reached 60° C., 0.1 part of ferrous sulfate, 0.4 parts of sodium pyrophosphate, and 0.06 parts of sodium dithionite were added. Then, a mixture containing the following components was continuously added dropwise over 90 minutes. The resultant product was allowed to stand for 1 hour and then was cooled down.

| | |
|---|---|
| Acrylonitrile | 30 parts |
| Styrene | 70 parts |
| Cumene hydroperoxide | 0.4 parts |
| tert-dodecyl mercaptan | 1 part |

The thus yielded graft copolymer latex was coagulated with dilute sulfuric acid. The coagulated product was then washed, filtrated, and dried, thereby yielding a dried powder of the graft copolymer (A-1).

The content of an acetone-soluble matter in this graft copolymer (A-1) was 27%. Moreover, the reduced viscosity was 0.30 dl/g.

The measurement method of the acetone-soluble matter is as follows. 2.5 g of the graft copolymer is dipped in 90 ml of acetone, heated at 65° C. for 3 hours, and then centrifuged at 1500 rpm for 30 minutes by using a centrifugal separator. Thereafter, the supernatant liquid is discarded. The residue is dried at 65° C. for 12 hours by a vacuum drier, and the dried sample is precisely weighed. From the mass difference between before and after this process ([graft copolymer 2.5 g]−[mass weight of the dried sample]), the content rate (%) of the acetone-soluble matter relative to the graft copolymer can be determined.

The reduced viscosity was measured in a 0.2 g/dl N,N-dimethylformamide solution at 25° C.

[Preparation of Graft Copolymer (A-2)]

Raw materials at the following proportions were charged in a reactor vessel and polymerized under stirring with nitrogen replacement at 50° C. for 4 hours, thereby yielding a rubber latex.

| | |
|---|---|
| N-butyl acrylate | 98 parts |
| 1,3-butylene glycol dimethacrylate | 1 part |
| Allyl methacrylate | 1 part |
| Sodium dioctylsulfosuccinate | 2.0 parts |
| Deionized water | 300 parts |
| Potassium persulfate | 0.3 parts |
| Disodium phosphate dodecahydrate | 0.5 parts |
| Sodium hydrogen phosphate dodecahydrate | 0.3 parts |

100 parts (in terms of solid content) of the thus yielded rubber latex was charged in another reactor vessel, and diluted with 280 parts of ion exchange water. The diluted product was heated to 70° C.

Separately, 0.7 parts of benzoyl peroxide was dissolved in 100 parts of a monomer mixture consisting of acrylonitrile/styrene=29/71 (mass ratio), and the mixture was subjected to nitrogen replacement. Then, this monomer mixture was added at a rate of 30 parts/hour by a metering pump into the reactor vessel which contained the above-mentioned rubber latex. After all the monomers were added, the temperature inside the reactor vessel was raised to 80° C., and the mixture was kept stirred for 30 minutes, thereby yielding a graft copolymer latex. The polymerization rate was 99%.

This graft copolymer latex was charged into a coagulation bath which contained an aqueous solution of 0.15% aluminum chloride (AlCl$_3$.6H$_2$O) (90° C.) at a three times greater amount than the total amount of the latex, under stirring to effect coagulation. After all the latex was added, the temperature inside the coagulation bath was raised to 93° C., and the mixture was allowed to stand for 5 minutes. This was cooled down and then drained by a centrifugal separator. The drained product was washed and dried, thereby yielding a dried powder of the graft copolymer (A-2).

The content of an acetone-soluble matter in this graft copolymer (A-2) was 21%. Moreover, the reduced viscosity was 0.70 dl/g.

[Preparation of Graft Copolymer (A-3)]

The graft copolymer (A-3) including a composite rubber of polybutadiene/polybutyl acrylate as a rubber polymer was synthesized in the following manner.

To 20 parts (in terms of solid content) of a polybutadiene latex having an average particle diameter of 0.08 μm at a solid content concentration of 35% was added 0.4 parts of (in terms of solid content) a copolymer latex having an average particle diameter of 0.10 μm consisting of 82% of an n-butyl acrylate unit and 18% of a methacrylic acid unit, under stirring. Next, the mixture was kept stirred for 30 minutes, thereby yielding an enlarged diene-based rubber latex having an average particle diameter of 0.36 μm.

20 parts (in terms of solid content) of the yielded enlarged diene-based rubber latex was placed in a reactor vessel, to which 1 part of disproportionated rosin potassium, 150 parts of ion exchange water, and a monomer mixture having the following composition were added. The product was subjected to nitrogen replacement and then heated to 50° C. (internal temperature). Furthermore, a solution having 0.0002 parts of ferrous sulfate, 0.0006 parts of disodium ethylenediaminetetraacetate, and 0.25 parts of rongalit dissolved in 10 parts of ion exchange water was added into the reactor vessel, to effect a reaction.

| | |
|---|---|
| N-butyl acrylate | 80 parts |
| Allyl methacrylate | 0.32 parts |
| Ethylene glycol dimethacrylate | 0.16 parts |

The internal temperature at the completion of the reaction was 75° C. The solution was further heated up to 80° C., and the reaction was kept continued for 1 hour, thereby yielding a composite rubber of the enlarged diene-based rubber and the polyalkyl acrylate-based rubber. The polymerization rate was 98.8%.

Next, 50 parts (in terms of solid content) of the composite rubber latex of the enlarged diene-based rubber and the polyalkyl acrylate-based rubber was placed in a reactor vessel, which was then diluted with 140 parts of ion exchange water. The diluted solution was heated to 70° C.

Separately, 0.35 parts of benzoyl peroxide was dissolved in 50 parts of a monomer mixture consisting of acrylonitrile/styrene=29/71 (mass ratio), and the mixture was subjected to nitrogen replacement. This monomer mixture was added at a rate of 15 parts/hour by a metering pump into the reactor vessel which contained the above-mentioned rubber latex. After all the monomers were added, the temperature inside the reactor vessel was raised to 80° C., and the mixture was kept stirred for 30 minutes, thereby yielding a graft copolymer latex. The polymerization rate was 99%.

This graft copolymer latex was charged into a coagulation bath which contained 0.5% sulfuric acid solution (90° C.) at a three times greater amount than the total amount of the latex, under stirring to effect coagulation. After all the latex was added, the temperature inside the coagulation bath was raised to 93° C., and the mixture was allowed to stand for 5 minutes. This was cooled down and then drained by a centrifugal separator. The drained product was washed and dried, thereby yielding a dried powder of the graft copolymer (A-3).

The content of an acetone-soluble matter in this graft copolymer (A-3) was 20%. Moreover, the reduced viscosity was 0.66 dl/g.

[Preparation of Graft Copolymer (A-4)]

The graft copolymer (A-4) including a composite rubber of polysiloxane rubber/polybutyl acrylate as a rubber polymer was synthesized in the following manner.

96 parts of octamethyltetracyclosiloxane, 2 parts of γ-methacryloxypropyldimethoxymethylsilane, and 2 parts of ethyl orthosilicate were mixed to yield 100 parts of a siloxane-based mixture. This mixture was added with 300 parts of distilled water having 0.67 parts of sodium dodecylbenzene sulfonate dissolved therein. The mixture was stirred by a homomixer at 10000 revolutions/2 minutes, and then was homogenized under a pressure of 30 MPa once by a homogenizer, thereby yielding a stabilized premix organosiloxane latex.

In addition, 2 parts of dodecylbenzenesulfonic acid and 98 parts of distilled water were charged in a reactor vessel equipped with a reagent infusion container, a cooling tube, a jacket heater, and a stirring device, by which an aqueous solution of 2% dodecylbenzenesulfonic acid was prepared. This aqueous solution was heated to 85° C. In this state, the premix organosiloxane latex was added dropwise thereto over 4 hours. After the dropwise addition, the solution was kept at this temperature for 1 hour, and then was cooled down. The reaction solution was allowed to stand at room temperature for 48 hours, and then neutralized with an aqueous solution of sodium hydroxide, thereby yielding a polyorganosiloxane latex (L-1). A portion of the polyorganosiloxane latex (L-1) was dried at 170° C. for 30 minutes to obtain the solid content concentration. The thus obtained solid content concentration was 17.3%.

Next, 119.5 parts of the polyorganosiloxane latex (L-1) and 0.8 parts of sodium polyoxyethylene alkyl phenyl ether sulfate were charged in a reactor vessel equipped with a reagent infusion container, a cooling tube, a jacket heater, and a stirring device. Subsequently, 203 parts of distilled water was added and mixed therein. Then, a mixture consisting of 53.2 parts of n-butyl acrylate, 0.21 parts of allyl methacrylate, 0.11 parts of 1,3-butylene glycol dimethacrylate, and 0.13 parts of tertiary butyl hydroperoxide was added thereto. A nitrogen gas was let to flow through this reactor vessel so as to replace the inside atmosphere with nitrogen, and the temperature was raised to 60° C. When the internal temperature of the reactor vessel reached 60° C., an aqueous solution having 0.0001 part of ferrous sulfate, 0.0003 parts of disodium ethylenediaminetetraacetate, and 0.24 parts of rongalit dissolved in 10 parts of distilled water was added to initiate radical polymerization. Due to the polymerization of the acrylate components, the temperature of the solution increased to 78° C. This state was kept for 1 hour to complete the polymerization of the acrylate components, thereby yielding a composite rubber latex of polyorganosiloxane and a butyl acrylate rubber.

After the solution temperature inside the reactor vessel decreased to 60° C., an aqueous solution having 0.4 parts of rongalit dissolved in 10 parts of distilled water was added. Next, a mixed solution including 11.1 parts of acrylonitrile, 33.2 parts of styrene, and 0.2 parts of tertiary butyl hydroperoxide was added dropwise over about 1 hour to effect polymerization. After the dropwise addition, the solution was allowed to stand for 1 hour, and then was added with an aqueous solution having 0.0002 parts of ferrous sulfate, 0.0006 parts of disodium ethylenediaminetetraacetate, and 0.25 parts of rongalit dissolved in 10 parts of distilled water. Next, a mixed solution including 7.4 parts of acrylonitrile, 22.2 parts of styrene, and 0.1 part of tertiary butyl hydroperoxide was added dropwise over about 40 minutes to effect polymerization. After the dropwise addition, the solution was allowed to stand for 1 hour, and then was cooled down, thereby yielding a graft copolymer latex in which an acrylonitrile-styrene copolymer was grafted to the composite rubber consisting of polyorganosiloxane and the butyl acrylate rubber.

Next, 150 parts of a 5% calcium acetate aqueous solution was heated to 60° C. and stirred. Into this calcium acetate aqueous solution, 100 parts of the graft copolymer latex was gradually added dropwise to effect coagulation. The coagulated product was taken out, washed, and then dried, thereby yielding a dried powder of the graft copolymer (A-4).

The content of an acetone-soluble matter in this graft copolymer (A-4) was 26%. Moreover, the reduced viscosity was 0.60 dl/g.

[Preparation of Graft Copolymer (A-5)]

100 parts (in terms of solid content) of a polybutadiene latex having an average particle diameter of 0.08 μm at a solid content of 35% was placed in a reactor vessel, to which 100 parts of distilled water, 4 parts of a wood rosin emulsifier, 0.4 parts of Demol N (product name of naphthalene sulfonate formaldehyde condensate manufactured by Kao Chemicals), 0.04 parts of sodium hydroxide, and 0.7 parts of dextrose were added. The mixture was heated under stirring. When the internal temperature reached 60° C., 0.1 part of ferrous sulfate, 0.4 parts of sodium pyrophosphate, and 0.06 parts of sodium dithionite were added. Then, a mixture containing the following components was continuously added dropwise over 90 minutes. The resultant product was allowed to stand for 1 hour and then was cooled down.

| | |
|---|---|
| Acrylonitrile | 30 parts |
| Styrene | 70 parts |
| Cumene hydroperoxide | 0.4 parts |
| Tert-dodecyl mercaptan | 1 part |

The obtained graft copolymer latex was coagulated with dilute sulfuric acid. The coagulated product was then washed, filtrated, and dried, thereby yielding a dried powder of the graft copolymer (A-5).

The content of an acetone-soluble matter in this graft copolymer (A-5) was 26% by mass. The reduced viscosity (ηsp/C) at 25° C. was 0.32 (measured in a 0.2% dimethylformamide solution).

[Preparation of Graft Copolymer (A-6)]

To 100 parts (in terms of solid content) of a polybutadiene latex having an average particle diameter of 0.08 μm at a solid content of 33% was added 1.5 parts of a 5% sodium pyrophosphate aqueous solution in a reactor vessel, to which 137 parts of water was further added. The mixture inside the reactor vessel was sufficiently stirred, and then 1 part (in terms of solid content) of a copolymer latex having an average particle diameter of 0.145 μm consisting of 82% of an n-butyl acrylate unit and 18% of a methacrylic acid unit was added under stirring. The mixture was kept stirred for 30 minutes, thereby yielding an enlarged butadiene-based rubber polymer latex having an average particle diameter of 0.80 μm.

The yielded enlarged butadiene-based rubber polymer latex was placed in a reactor vessel, to which 100 parts of distilled water, 4 parts of a wood rosin emulsifier, 0.4 parts of Demol N (product name of naphthalene sulfonate formaldehyde condensate manufactured by Kao Chemicals), 0.04 parts of sodium hydroxide, and 0.7 parts of dextrose were added. The mixture was heated under stirring. When the internal temperature reached 60° C., 0.1 part of ferrous sulfate, 0.4 parts of sodium pyrophosphate, and 0.06 parts of sodium dithionite were added. Then, a mixture containing the following components was continuously added dropwise over 90 minutes. The resultant product was allowed to stand for 1 hour and then was cooled down.

| | |
|---|---|
| Acrylonitrile | 30 parts |
| Styrene | 70 parts |
| Cumene hydroperoxide | 0.4 parts |
| tert-dodecyl mercaptan | 1 part |

The obtained graft copolymer latex was coagulated with dilute sulfuric acid. The coagulated product was then washed, filtrated, and dried, thereby yielding a dried powder of the graft copolymer (A-6).

The content of an acetone-soluble matter in this graft copolymer (A-6) was 20% by mass. The reduced viscosity (ηsp/C) at 25° C. was 0.31 (measured in a 0.2% dimethylformamide solution).

[Preparation of Graft Copolymer (A-7)]

To 100 parts (in terms of solid content) of a polybutadiene latex having an average particle diameter of 0.08 μm at a solid content concentration of 35% was added 2 parts (in terms of solid content) of a copolymer latex having an average particle diameter of 0.145 μm consisting of 82% of an n-butyl acrylate unit and 18% of a methacrylic acid unit, under stirring. Next, the mixture was kept stirred for 30 minutes, thereby yielding an enlarged butadiene-based rubber polymer latex having an average particle diameter of 0.42 μm.

The yielded enlarged butadiene-based rubber polymer latex was placed in a reactor vessel, to which 100 parts of distilled water, 4 parts of a wood rosin emulsifier, 0.4 parts of Demol N (product name of naphthalene sulfonate formaldehyde condensate manufactured by Kao Chemicals), 0.04 parts of sodium hydroxide, and 0.7 parts of dextrose were further added. Next, the mixture was heated under stirring. When the internal temperature reached 60° C., 0.1 part of ferrous sulfate, 0.4 parts of sodium pyrophosphate, and 0.06 parts of sodium dithionite were added. Then, a mixture containing the following components was continuously added dropwise over 90 minutes. The resultant product was allowed to stand for 1 hour and then was cooled down.

| | |
|---|---|
| Acrylonitrile | 30 parts |
| Styrene | 70 parts |
| Cumene hydroperoxide | 0.4 parts |
| tert-dodecyl mercaptan | 1 part |

The thus yielded graft copolymer latex was coagulated with dilute sulfuric acid. The coagulated product was then washed, filtrated, and dried, thereby yielding a dried powder of the graft copolymer (A-7).

The content of an acetone-soluble matter in this graft copolymer (A-7) was 25%. Moreover, the reduced viscosity was 0.31 dl/g.

[Preparation of Graft Copolymer (A-8)]

To 100 parts (in terms of solid content) of a polybutadiene latex having an average particle diameter of 0.08 μm at a solid content of 33% was added 2 parts (in terms of solid content) of a copolymer latex having an average particle diameter of 0.290 μm consisting of 77% of an n-butyl acrylate unit and 23% of a methacrylic acid unit, under stirring. The mixture was kept stirred for 45 minutes, thereby yielding an enlarged butadiene-based rubber polymer latex having an average particle diameter of 0.51 μm.

The yielded enlarged butadiene-based rubber polymer latex was placed in a reactor vessel, to which 100 parts of distilled water, 4 parts of a wood rosin emulsifier, 0.4 parts of Demol N (product name of naphthalene sulfonate formaldehyde condensate manufactured by Kao Chemicals), 0.04 parts of sodium hydroxide, and 0.7 parts of dextrose were further added. Next, the mixture was heated under stirring. When the internal temperature reached 60° C., 0.1 part of ferrous sulfate, 0.4 parts of sodium pyrophosphate, and 0.06 parts of sodium dithionite were added. Then, a mixture containing the following components was continuously added dropwise over 90 minutes. The resultant product was allowed to stand for 1 hour and then was cooled down.

| | |
|---|---|
| Acrylonitrile | 30 parts |
| Styrene | 70 parts |
| Cumene hydroperoxide | 0.4 parts |
| tert-dodecyl mercaptan | 1 part |

The thus yielded graft copolymer latex was coagulated with dilute sulfuric acid. The coagulated product was then washed, filtrated, and dried, thereby yielding a dried powder of the graft copolymer (A-8).

The content of an acetone-soluble matter in this graft copolymer (A-8) was 23%. Moreover, the reduced viscosity was 0.30 dl/g.

[Vinyl-Based Copolymer (B-1)]

A copolymer having a composition of 29% of an acrylonitrile unit and 71% of a styrene unit was prepared by suspension polymerization. The reduced viscosity ($\eta sp/C$) of this copolymer at 25° C. was 0.62 g/dl (measured in a 0.2% dimethylformamide solution).

[Polycarbonate Resin (B-2)]

The "Novarex 7021PJ" manufactured by Mitsubishi Engineering-Plastics Corporation was used as the polycarbonate resin (B-2).

[Polybutylene Terephthalate Resin (B-3)]

The "TAFPET PBT N1500" manufactured by Mitsubishi Rayon Co., Ltd. was used as the polybutylene terephthalate resin (B-3).

[Inorganic Filler (D)]

The "TR06U" manufactured by Mitsubishi Rayon Co., Ltd. was used as the inorganic filler (D-1).

The glass fiber "ECS03-T191" manufactured by Nippon Electric Glass Co., Ltd. was used as the inorganic filler (D-2).

The wollastonite "NYGLOS-G" manufactured by NYCO Minerals, Inc. was used as the inorganic filler (D-3).

[Glycidyl Ether Unit-Containing Polymer (E)]

The "1256" (mass average molecular weight; 50,000) manufactured by Japan Epoxy Resins Co., Ltd. was used as the glycidyl ether unit-containing polymer (E-1).

The "1004" (mass average molecular weight; 1,650) manufactured by Japan Epoxy Resins Co., Ltd. was used as the glycidyl ether unit-containing polymer (E-2).

The "1001" (mass average molecular weight; 900) manufactured by Japan Epoxy Resins Co., Ltd. was used as the glycidyl ether unit-containing polymer (E-3).

[Phosphate Ester-Based Flame-Retardant Agent (F)]

The "PX-200" (molecular weight 686) manufactured by Daihachi Chemical Industry Co. Ltd. was used as the phosphate ester-based flame-retardant agent (F-1).

The "CR-733S" (molecular weight 574) manufactured by Daihachi Chemical Industry Co. Ltd. was used as the phosphate ester-based flame-retardant agent (F-2).

The "Reofos BAPP" (molecular weight 692) manufactured by Ajinomoto Fine-Techno Co., Inc. was used as the phosphate ester-based flame-retardant agent (F-3).

Triphenylene phosphate (molecular weight 326) was used as the phosphate ester-based flame-retardant agent (F-4).

In addition, in examples in which the flame retardancy was given by the phosphate ester-based flame-retardant agent (F), polytetrafluoroethylene (PTFE) was added as the flame-retardant auxiliary agent.

Examples 1 to 68 and Comparative Examples 1 to 14

The graft copolymers (A-1) to (A-8), the matrix polymers (B-1) to (B-3), the inorganic fillers (D-1) to (D-3), the glycidyl ether unit-containing polymers (E-1) to (E-3), and the phosphate ester-based flame-retardant agents (F-1) to (F-4) were mixed shown in Tables 2 to 9, to obtain reinforced resin compositions for plating bases.

The obtained reinforced resin compositions for plating bases were evaluated for the flame retardancy, the moldability, the surface appearance of the molded article, the plating ability, and physical properties of the plated product in the following manners. These evaluation results are shown in Tables 10 to 17.

[Flame Retardancy]

Test specimen (width 12.7 mm, length 127 mm, thickness 1.0 mm) were made by molding the reinforced thermoplastic resin, and subjected to a burning test in accordance with UL94. To evaluate the flame retardancy, the examples 1 to 29 and the comparative examples 1 to 9 and 11 to 14 not including the phosphate ester-based flame-retardant agent (F) were subjected to the horizontal burning test, and the examples 30 to 68 including the phosphate ester-based flame-retardant agent (F) were subjected to the vertical burning test. It was impossible to make a molded article in the comparative example 10, and thus the evaluation of the flame retardancy was not feasible.

(1) Horizontal Burning Test

The test specimens were horizontally supported. A burner flame was applied to the edges of these specimens for 30 seconds and then removed. After the removal of the flame, the time for the flame to travel between two gauge marks (75 mm) which were previously marked on the test specimens was measured. The thus calculated burning rate was used for the evaluation. The summary of the criteria of UL94 are as follows.

HB; Burning ceases after the removal of the flame, and the burn rate may not exceed 75 mm/min.

The flame retardancy is expressed by the following scales in the column of the flame retardancy of the examples 1 to 29 and the comparative examples 1 to 9 and 11 to 14.

○: The flame retardancy was in the HB level.

X: The flame retardancy was below the HB level.

(2) Vertical Burning Test

The test specimens were vertically supported. A burner flame was applied to the lower edges of these specimens for 10 seconds and then removed. After burning ceased, the burner flame was reapplied and the same procedure was done. The evaluation was made based on the flaming combustion time after the removal of the first flame, the total of the second flaming combustion time and the flameless combustion time, and the presence or absence of drips after burning. The summary of the criteria of respective grades of UL94 are as follows.

V-0: The first flaming combustion time may not exceed 10 seconds. The total of the second flaming combustion time and the flameless combustion time may not exceed 30 seconds. Drips after burning are not allowed.

V-1: The first flaming combustion time may exceed 10 seconds but may not exceed 30 seconds. The total of the second flaming combustion time and the flameless combustion time may exceed 30 seconds but may not exceed 60 seconds. Drips after burning are not allowed.

V-2: The first flaming combustion time may exceed 10 seconds but may not exceed 30 seconds. The total of the second flaming combustion time and the flameless combustion time may exceed 30 seconds but may not exceed 60 seconds. Drips after burning are allowed.

The flame retardancy is expressed by the following scales in the column of the flame retardancy of the examples 30 to 68 and the comparative example 10.

⊚: The flame retardancy was in the V-0 level.
○: The flame retardancy was in the V-1 level.
Δ: The flame retardancy was in the V-2 level.
X: The flame retardancy was below the V-2 level.

[Moldability]

(1) Fluidity

An approximately box-shaped molded article (297 mm×185 mm×20 mm (1.25 mm in thickness)) was made by injection molding to check whether or not molding was feasible within 3 seconds of filling time. The machine used for the injection molding was the J350E molding machine with a 350t clamp capacity accumulator, manufactured by The Japan Steel Works, LTD. Regarding the molding condition, the cylinder temperature and the mold temperature were set to the conditions shown in Table 1, with consideration of the mixture of the respective fiber-reinforced resin compositions for plating bases. The evaluation was made based on the following criteria.

⊚: Molding was feasible at the cylinder temperature of Table 1.
○: Molding was feasible at the cylinder temperature of Table 1+10° C.
Δ: Molding was feasible at the cylinder temperature of Table 1+20° C.
X: Molding was not feasible even at the cylinder temperature of Table 1+20° C.

TABLE 1

|  | Presence or Absence in mixture | | Molding condition | |
| --- | --- | --- | --- | --- |
|  | B-2 component | F component | Cylinder temperature (° C.) | Mold temperature (° C.) |
| Condition 1 | Absent | Absent | 260 | 60 |
| Condition 2 | Present | Absent | 280 | 80 |
| Condition 3 | Absent | Present | 240 | 60 |
| Condition 4 | Present | Present | 260 | 80 |

(2) Gas

An approximately box-shaped molded article (297 mm×185 mm×20 mm (1.25 mm in thickness)) was made by injection molding to check the presence or absence of gas deposition on the surface of the mold. The machine used for the injection molding was the J350E molding machine with a 350t clamp capacity accumulator, manufactured by The Japan Steel Works, LTD. The molding condition was set to the condition shown in Table 1, likewise of the evaluation of fluidity. The evaluation was made based on the following criteria.

⊚: No gas deposition was found.
○: Gas blooming (slight gas deposition) occurred after 100 shots.
X: Gas deposition occurred after 50 shots.

[Test for Surface Appearance of Molded Article]

A flat plate (100 mm×100 mm×3 mm (in thickness)) was made by injection molding to check the surface appearance of the molded article by eyes. The machine used for the injection molding was the J75E-B molding machine with a 75t clamp capacity accumulator, manufactured by The Japan Steel Works, LTD. The molding condition was set to the condition shown in Table 1, likewise of the evaluation of fluidity. The evaluation was made based on the following criteria.

⊚: No protrusion of the inorganic filler was found on the surface of the molded article.
○: Protrusion of the inorganic filler was found on the surface of the molded article, but the surface was glossy.
X: Protrusion of the inorganic filler was found on the surface of the molded article, and the surface was not glossy.

[Plating Ability]

A plating treatment was applied to a flat plate (100 mm×100 mm×3 mm (in thickness)) by the plating process as shown below to observe if there was any failure of plating adhesion. The evaluation was made based on the following criteria.

⊚: No failure of plating adhesion was found.
○: A slight failure of plating adhesion was found in a proportional area from 0 to under 1%.
Δ: A slight failure of plating adhesion was found in a proportional area from 1 to under 5%.
X: Failure of plating adhesion was found in a proportional area of 5% or over.

Plating Process (1) degreasing (at 60° C. for 3 minutes)→(2) washing with water→(3) etching (400 g/l of chromium trioxide ($CrO_3$) and 200 cc/l of sulfuric acid at 60° C. for 8 minutes)→(4) washing with water→(5) acid treatment (at normal temperature for 1 minute)→(6) washing with water→(7) catalyzing treatment (at 25° C. for 3 minutes)→(8) washing with water→(9) activating treatment (at 40° C. for 5 minutes)→(10) washing with water→(11) chemical nickel plating→(12) washing with water→(13) copper electroplating (plating layer in a thickness of 15 μm at 20° C. for 20 minutes)→(14) washing with water→(15) nickel electroplating (plating layer in a thickness of 10 μm at 55° C. for 15 minutes)→(16) washing with water→(17) drying In the examples 7 and 23, however, the steps (13) and (14) were omitted from the above-mentioned process, and the time for the step (15) was set at 6 minutes to apply electroplating so as to form a plating layer in a thickness of 4 μm.

[Physical Properties of Plated Product]

Surface Appearance

A plating treatment was applied to a flat plate (100 mm×100 mm×3 mm (in thickness)) by the above-mentioned plating process, and then the surface of the metal plating layer was wiped with a gauze to check the presence or absence of surface projections according to the degree how the gauze was scratched.

⊚: No projection was present (the gauze was not scratched).
○: Projections were present in some parts and the gauze was slightly scratched.
X: Many projections were present and the gauze was scratched.

Bend Elastic Constant

The bend elastic constant was measured as an index to indicate the rigidity. A plating treatment was applied to test specimens (10 mm×100 mm×4 mm (in thickness)) by the above-mentioned plating process, and then the bend elastic constant was measured in accordance with the ISO 178. A higher bend elastic constant means a higher rigidity.

Plating Adhesion Strength

A plating treatment was applied to test specimens (10 mm×100 mm×3 mm (in thickness)) by the following process. Then, the plated film was vertically separated by a load tester, and the strength required for the separation was measured.

Plating Process (1) degreasing (at 60° C. for 3 minutes)→(2) washing with water→(3) etching (400 g/l of chromium trioxide ($CrO_3$) and 200 cc/l of sulfuric acid at 60° C. for 8 minutes)→(4)

washing with water→(5) acid treatment (at normal temperature for 1 minute)→(6) washing with water→(7) catalyzing treatment (at 25° C. for 3 minutes)→(8) washing with water→(9) activating treatment (at 40° C. for 5 minutes)→(10) washing with water→(11) chemical nickel plating→(12) washing with water→(13) copper electroplating (plating layer in a thickness of 15 μm at 20° C. for 20 minutes)→(14) washing with water→(17) drying ⊙: 1.0 kg/cm or over ○: 0.8 to 1.0 kg/cm Δ: 0.6 to 0.8 kg/cm X: below 0.6 kg/cm Thermal Cycle Property A plating treatment was applied to a flat plate (100 mm×100 mm×3 mm (in thickness)) by the above-mentioned plating process and then was tested under the following thermal cycle condition to observe the occurrence of bulging in the metal plating layer.

○: Not changed.

X: Bulging occurred around the gates only.

xx: Bulging occurred not only around the gates but also other areas.

xxx: Bulging occurred all over the surface.

(Thermal Cycle Condition)

Three cycles, each consisting of −30° C. for 1 hour→23° C. for 15 minutes→80° C. for 1 hour→23° C. for 1 hour, were carried out.

TABLE 2

| | | \multicolumn{11}{c}{Example No.} | | | | | | | | | | |
|---|---|---|---|---|---|---|---|---|---|---|---|
| | | 1 | 2 | 3 | 4 | 5 | 6 | 7 | 8 | 9 | 10 | 11 |
| A | A-1 (%) | 40 | | | | | | | | | | |
| | A-2 (%) | | 40 | | | | | | | | | |
| | A-3 (%) | | | 40 | | | | | | | | |
| | A-4 (%) | | | | | | | | 40 | | | |
| | Acetone insoluble matter (%) | 29.2 | 31.6 | 32.0 | | | | | 29.6 | | | |
| | Rubber polymer Content (%) | | | | | | 20 | | | | | |
| | Average particle diameter (μm) | 0.28 | 0.25 | 0.36 | | | | | 0.14 | | | |
| B | B-1 (%) | | | | | | 60 | | | | | |
| | B-2 (%) | | | | | | | | | | | |
| | B-3 (%) | | | | | | | | | | | |
| | Acetone soluble matter of A (%) | 10.8 | 8.4 | 8.0 | | | | | 10.4 | | | |
| D | D-1 (parts) | | 11.8 | | | | | 11.8 | 11.2 | 11.3 | 12.6 | 13.3 |
| | D-2 (parts) | | | | | 35.3 | | | | | | |
| | D-3 (parts) | | | | | | 45.4 | | | | | |
| | Proportion in the composition (%) | | 10 | | | 25 | 30 | | 10 | | | |
| E | E-1 (parts) | | | | 6 | | | | 0.5 | 2.0 | 14 | 20 |
| | E-2 (parts) | | | | | | | | | | | |
| | E-3 (parts) | | | | | | | | | | | |

TABLE 3

| | | \multicolumn{8}{c}{Example No.} | | | | | | | |
|---|---|---|---|---|---|---|---|---|---|
| | | 12 | 13 | 14 | 15 | 16 | 17 | 18 | 19 |
| A | A-1 (%) | | | | 20 | | | | |
| | A-2 (%) | | | | | 20 | | | |
| | A-3 (%) | | | | | | 20 | 20 | 20 |
| | A-4 (%) | | | | | | | 20 | |
| | A-7 (%) | 40 | | | | | | | |
| | A-8 (%) | | 40 | | | | | | |
| | Acetone insoluble matter (%) | 30.0 | 30.8 | 14.6 | 15.8 | 16.0 | | 14.8 | |
| | Rubber polymer Content (%) | | 20 | | | | 10 | | |
| | Average particle diameter (μm) | 0.42 | 0.51 | 0.28 | 0.25 | 0.36 | | 0.14 | |
| B | B-1 (%) | | 60 | | | | 10 | | |
| | B-2 (%) | | | | | | 70 | | |
| | B-3 (%) | | | | | | | | |
| | Acetone soluble matter of A | 10 | 9.2 | 5.4 | 4.2 | 4.0 | | 5.2 | |
| D | D-1 (parts) | | 13.3 | | | 11.8 | | | |
| | D-2 (parts) | | | | | | | 35.3 | |
| | D-3 (parts) | | | | | | | | 45.4 |
| | Proportion in the composition (%) | | 10 | | | 10 | | 25 | 30 |
| E | E-1 (parts) | | | | | | 6 | | |
| | E-2 (parts) | | | | | | | | |
| | E-3 (parts) | | | | | | | | |

TABLE 4

| | | Example No. | | | | | | | | | |
|---|---|---|---|---|---|---|---|---|---|---|---|
| | | 20 | 21 | 22 | 23 | 24 | 25 | 26 | 27 | 28 | 29 |
| A | A-1 (%) | | | | | | | | | | |
| | A-2 (%) | | | | | | | | | | |
| | A-3 (%) | | | | | | | | | | |
| | A-4 (%) | 20 | | 15 | | | 20 | | | | |
| | A-7 (%) | | | | | | | | | 20 | |
| | A-8 (%) | | | | | | | | | | 20 |
| | Acetone insoluble matter (%) | 14.8 | | 11.1 | | | 14.8 | | | 15.0 | 15.4 |
| | Rubber polymer | | | | | | | | | | |
| | Content (%) | 10 | | 7.5 | | | 10 | | | | |
| | Average particle diameter (μm) | | | | 0.14 | | | | | 0.42 | 0.51 |
| B | B-1 (%) | | | | | 10 | | | | | |
| | B-2 (%) | | | | | 70 | | | | | |
| | B-3 (%) | | | 5 | | | | | | | |
| | Acetone soluble matter of A (%) | 5.2 | 5.2 | 3.9 | | | 5.2 | | | 5.0 | 4.6 |
| D | D-1 (parts) | 26.5 | 45.4 | 11.8 | 11.8 | 11.2 | 11.3 | | 12.6 | 13.3 | |
| | D-2 (parts) | | | | | | | | | | |
| | D-3 (parts) | | | | | | | | | | |
| | Proportion in the composition (%) | 20 | 30 | | | | 10 | | | | |
| E | E-1 (parts) | | 6 | | | 0.5 | 2 | 14 | 20 | 6 | 6 |
| | E-2 (parts) | | | | | | | | | | |
| | E-3 (parts) | | | | | | | | | | |

TABLE 5

| | | Example No. | | | | | | | | | |
|---|---|---|---|---|---|---|---|---|---|---|---|
| | | 30 | 31 | 32 | 33 | 34 | 35 | 36 | 37 | 38 | 39 |
| A | A-1 (%) | 40 | | | | | | | | | |
| | A-2 (%) | | 40 | | | | | | | | |
| | A-3 (%) | | | 40 | | | | | | | |
| | A-4 (%) | | | | | | | 40 | | | |
| | Acetone insoluble matter (%) | 29.2 | 31.6 | 32.0 | | | | 29.6 | | | |
| | Rubber polymer | | | | | | | | | | |
| | Content (%) | | | | | 20 | | | | | |
| | Average particle diameter (μm) | 0.28 | 0.25 | 0.36 | | | | 0.14 | | | |
| B | B-1 (%) | | | | | 60 | | | | | |
| | B-2 (%) | | | | | | | | | | |
| | B-3 (%) | | | | | | | | | | |
| | Acetone soluble matter of A | 10.8 | 8.4 | 8.0 | | | | 10.4 | | | |
| D | D-1 (parts) | | 15.2 | | | | | 14.6 | 14.7 | 16.1 | 16.7 |
| | D-2 (parts) | | | | | 45.5 | | | | | |
| | D-3 (parts) | | | | | | 58.5 | | | | |
| | Proportion in the composition (%) | | 10 | | | 25 | 30 | | | 10 | |
| E | E-1 (parts) | | | 6 | | | | 0.5 | 2.0 | 14 | 20 |
| | E-2 (parts) | | | | | | | | | | |
| | E-3 (parts) | | | | | | | | | | |
| F | F-1 (parts) | | | | | 30 | | | | | |
| | F-2 (parts) | | | | | | | | | | |
| | F-3 (parts) | | | | | | | | | | |
| | PTFE (parts) | | | | | | 0.5 | | | | |

TABLE 6

| | | Example No. | | | | | | | | |
|---|---|---|---|---|---|---|---|---|---|---|
| | | 40 | 41 | 42 | 43 | 44 | 45 | 46 | 47 | 48 |
| A | A-1 (%) | 20 | | | | | | | | |
| | A-2 (%) | | 20 | | | | | | | |
| | A-3 (%) | | | 20 | | | | | | |
| | A-4 (%) | | | | | | 20 | | | 15 |
| | Acetone insoluble matter (%) | 14.6 | 15.8 | 16.0 | | | 14.8 | | | 11.1 |
| | Rubber polymer | | | | | | | | | |
| | Content (%) | | | | | 10 | | | | 7.5 |

TABLE 6-continued

| | | Example No. | | | | | | | | |
|---|---|---|---|---|---|---|---|---|---|---|
| | | 40 | 41 | 42 | 43 | 44 | 45 | 46 | 47 | 48 |
| | Average particle diameter (μm) | 0.28 | 0.25 | 0.36 | | | 0.14 | | | |
| B | B-1 (%) | | | | | 10 | | | | |
| | B-2 (%) | | | | | 70 | | | | |
| | B-3 (%) | | | | | | | | | 5 |
| | Acetone soluble matter of A | 5.4 | 4.2 | 4.0 | | | 5.2 | | | 3.9 |
| D | D-1 (parts) | | 14.1 | | | | | 31.6 | 54.2 | 14.1 |
| | D-2 (parts) | | | | | 42.2 | | | | |
| | D-3 (parts) | | | | | | 54.2 | | | |
| | Proportion in the composition (%) | | 10 | | | 25 | 30 | 20 | 30 | 10 |
| E | E-1 (parts) | | | | | 6 | | | | |
| | E-2 (parts) | | | | | | | | | |
| | E-3 (parts) | | | | | | | | | |
| F | F-1 (parts) | | | | | 20 | | | | |
| | F-2 (parts) | | | | | | | | | |
| | F-3 (parts) | | | | | | | | | |
| | PTFE (parts) | | | | | 0.5 | | | | |

TABLE 7

| | | Example No. | | | | | | | | | | |
|---|---|---|---|---|---|---|---|---|---|---|---|---|
| | | 49 | 50 | 51 | 52 | 53 | 54 | 55 | 56 | 57 | 58 | 59 |
| A | A-1 (%) | | | | | | | | | | | |
| | A-2 (%) | | | | | | | | | | | |
| | A-3 (%) | | | | | | | | | | | |
| | A-4 (%) | | | | | | 20 | | | | | |
| | Acetone insoluble matter (%) | | | | | | 14.8 | | | | | |
| | Rubber polymer | | | | | | | | | | | |
| | Content (%) | | | | | | 10 | | | | | |
| | Average particle diameter (μm) | | | | | | 0.14 | | | | | |
| B | B-1 (%) | | | | | | 10 | | | | | |
| | B-2 (%) | | | | | | 70 | | | | | |
| | B-3 (%) | | | | | | | | | | | |
| | Acetone soluble matter of A (%) | | | | | | 5.2 | | | | | |
| D | D-1 (parts) | 13.4 | 13.6 | 14.9 | 15.6 | 16.5 | 14.1 | | | 14.1 | | |
| | D-2 (parts) | | | | | | | 42.2 | | | 42.2 | |
| | D-3 (parts) | | | | | | | | 54.2 | | | 54.2 |
| | Proportion in the composition (%) | | | | 10 | | | 25 | 30 | 10 | 25 | 30 |
| E | E-1 (parts) | 0.5 | 2 | 14 | 20 | 6 | | | | | | |
| | E-2 (parts) | | | | | | | 6 | | | | |
| | E-3 (parts) | | | | | | | | | 6 | | |
| F | F-1 (parts) | | | | 20 | | 42 | | | 20 | | |
| | F-2 (parts) | | | | | | | | | | | |
| | F-3 (parts) | | | | | | | | | | | |
| | PTFE (parts) | | | | | | 0.5 | | | | | |

TABLE 8

| | | Example No. | | | | | | | | |
|---|---|---|---|---|---|---|---|---|---|---|
| | | 60 | 61 | 62 | 63 | 64 | 65 | 66 | 67 | 68 |
| A | A-1 (%) | | | | | | | | | |
| | A-2 (%) | | | | | | | | | |
| | A-3 (%) | | | | | | | | | |
| | A-4 (%) | | | | | 20 | | | | |
| | Acetone insoluble matter (%) | | | | | 14.8 | | | | |
| | Rubber polymer | | | | | | | | | |
| | Content (%) | | | | | 10 | | | | |
| | Average particle diameter (μm) | | | | | 0.14 | | | | |

TABLE 8-continued

|   |   | Example No. | | | | | | | | |
|---|---|---|---|---|---|---|---|---|---|---|
|   |   | 60 | 61 | 62 | 63 | 64 | 65 | 66 | 67 | 68 |
| B | B-1 (%) |  |  | 10 |  |  |  |  | 5 |  |
|   | B-2 (%) |  |  | 70 |  |  |  |  | 75 |  |
|   | B-3 (%) |  |  |  |  |  |  |  |  |  |
|   | Acetone soluble matter of A (%) |  |  |  |  | 5.2 |  |  |  |  |
| D | D-1 (parts) | 14.1 |  |  | 14.1 |  |  | 13.5 |  |  |
|   | D-2 (parts) |  | 42.2 |  |  | 42.2 |  |  | 40.5 |  |
|   | D-3 (parts) |  |  | 54.2 |  |  | 54.2 |  |  | 52.1 |
|   | Proportion in the composition (%) | 10 | 25 | 30 | 10 | 25 | 30 | 10 | 25 | 30 |
| E | E-1 (parts) |  |  |  |  | 6 |  |  |  |  |
|   | E-2 (parts) |  |  |  |  |  |  |  |  |  |
|   | E-3 (parts) |  |  |  |  |  |  |  |  |  |
| F | F-2 (parts) |  | 20 |  |  |  |  |  |  |  |
|   | F-3 (parts) |  |  |  |  | 20 |  |  |  |  |
|   | F-4 (parts) |  |  |  |  |  |  |  | 15 |  |
|   | PTFE (parts) |  |  |  |  | 0.5 |  |  |  |  |

TABLE 9

|   |   | Comparative example No. | | | | | | | | | | | | | |
|---|---|---|---|---|---|---|---|---|---|---|---|---|---|---|
|   |   | 1 | 2 | 3 | 4 | 5 | 6 | 7 | 8 | 9 | 10 | 11 | 12 | 13 | 14 |
| A | A-4 (%) | 8 | 62 | 8 | 62 |  |  |  |  |  |  | 20 |  |  |  |
|   | A-5 (%) |  |  |  |  | 40 |  | 20 |  |  |  |  |  |  |  |
|   | A-6 (%) |  |  |  |  |  | 40 |  | 20 |  |  |  |  |  |  |
|   | Acetone insoluble matter (%) | 5.9 | 45.9 | 5.9 | 45.9 | 29.6 | 32.0 | 14.8 | 16.0 |  |  | 14.8 |  |  |  |
|   | Rubber polymer |  |  |  |  |  |  |  |  |  |  |  |  |  |  |
|   | Content (%) | 4 | 31 | 4 | 31 |  |  |  |  |  |  | 10 |  |  |  |
|   | Average particle diameter (μm) |  | 0.36 |  | 0.08 | 0.80 | 0.08 | 0.80 |  |  |  | 0.14 |  |  |  |
| B | B-1 (%) | 92 | 38 | 22 |  | 60 | 60 |  |  |  | 10 |  |  |  |  |
|   | B-2 (%) |  |  | 70 | 38 |  |  |  |  |  | 70 |  |  |  |  |
|   | B-3 (%) |  |  |  |  |  |  |  |  |  |  |  |  |  |  |
|   | Acetone soluble matter of A (%) | 2.1 | 16.1 | 2.1 | 16.1 | 10.4 | 8.0 | 5.2 | 4.0 |  |  | 5.2 |  |  |  |
| D | D-1 (parts) |  |  |  |  | 11.8 |  |  |  |  | 61.3 | 11.1 |  |  | 13.9 |
|   | D-2 (parts) |  |  |  |  |  |  |  |  |  |  |  | 33.3 |  |  |
|   | D-3 (parts) |  |  |  |  |  |  |  |  |  |  |  |  | 42.9 |  |
|   | Proportion in the composition (%) |  |  |  |  | 10 |  |  |  | 0 | 31 | 10 | 25 | 30 | 10 |
| E | E-1 (parts) |  |  |  |  |  | 6 |  |  |  |  |  |  |  | 25 |
|   | E-2 (parts) |  |  |  |  |  |  |  |  |  |  |  |  |  |  |
|   | E-3 (parts) |  |  |  |  |  |  |  |  |  |  |  |  |  |  |
| F | F-1 (parts) |  |  |  |  |  |  |  |  |  | 30 |  |  |  |  |
|   | F-2 (parts) |  |  |  |  |  |  |  |  |  |  |  |  |  |  |
|   | F-3 (parts) |  |  |  |  |  |  |  |  |  |  |  |  |  |  |
|   | PTFE (parts) |  |  |  |  |  |  |  | 0.5 |  |  |  |  |  |  |

TABLE 10

|   |   | Example No. | | | | | | | | | |
|---|---|---|---|---|---|---|---|---|---|---|---|
|   |   | 1 | 2 | 3 | 4 | 5 | 6 | 7 | 8 | 9 | 10 |
| Flame retardancy | Horizontal burning | ◯ | ◯ | ◯ | ◯ | ◯ | ◯ | ◯ | ◯ | ◯ | ◯ |
| Moldability | Fluidity | ◎ | ◎ | ◎ | ◎ | ◎ | ◎ | ◎ | ◎ | ◎ | ◎ |
|   | Gas | ◎ | ◎ | ◎ | ◎ | ◎ | ◎ | ◎ | ◎ | ◎ | ◎ |
|   | Surface appearance of molded article | ◯ | ◯ | ◯ | ◯ | ◎ | ◎ | ◯ | ◯ | ◯ | ◯ |
|   | Plating ability | ◎ | ◎ | ◎ | ◎ | ◎ | ◎ | ◎ | ◎ | ◎ | ◎ |
|   | Plate adhesion strength | ◎ | ◎ | ◎ | ◎ | ◎ | ◎ | ◎ | ◎ | ◎ | ◎ |
| Physical properties | Plating surface appearance | ◎ | ◎ | ◎ | ◎ | ◎ | ◎ | ◎ | ◯ | ◎ | ◎ |

TABLE 10-continued

|  |  | Example No. | | | | | | | | | |
|---|---|---|---|---|---|---|---|---|---|---|---|
|  |  | 1 | 2 | 3 | 4 | 5 | 6 | 7 | 8 | 9 | 10 |
| of plated product | Bend elastic constant (MPa) | 14000 | 14000 | 14000 | 14000 | 13500 | 13000 | 7200 | 14000 | 14000 | 14000 |
|  | Thermal cycle property | ○ | ○ | ○ | ○ | ○ | ○ | ○ | ○ | ○ | ○ |

TABLE 11

|  |  | Example No. | | | | | | | | | |
|---|---|---|---|---|---|---|---|---|---|---|---|
|  |  | 11 | 12 | 13 | 14 | 15 | 16 | 17 | 18 | 19 | 20 |
| Flame retardancy | Horizontal burning | ○ | ○ | ○ | ○ | ○ | ○ | ○ | ○ | ○ | ○ |
| Moldability | Fluidity | ◎ | ◎ | ◎ | ◎ | ◎ | ◎ | ◎ | ◎ | ◎ | ○ |
|  | Gas | ◎ | ◎ | ◎ | ◎ | ◎ | ◎ | ◎ | ◎ | ◎ | ◎ |
| Surface appearance of molded article |  | ○ | ○ | ○ | ○ | ○ | ○ | ○ | ◎ | ◎ | ○ |
| Plating ability |  | ○ | ◎ | ◎ | ◎ | ◎ | ◎ | ◎ | ◎ | ◎ | ◎ |
| Plate adhesion strength |  | ◎ | ○ | △ | ◎ | ◎ | ◎ | ◎ | ◎ | ◎ | ◎ |
| Physical properties of plated product | Plating surface appearance | ◎ | ◎ | ◎ | ◎ | ◎ | ◎ | ◎ | ◎ | ◎ | ◎ |
|  | Bend elastic constant (MPa) | 14000 | 14000 | 14000 | 14000 | 14000 | 14000 | 15000 | 14000 | 13500 | 21000 |
|  | Thermal cycle property | ○ | ○ | ○ | ○ | ○ | ○ | ○ | ○ | ○ | ○ |

TABLE 12

|  |  | Example No. | | | | | | | | |
|---|---|---|---|---|---|---|---|---|---|---|
|  |  | 21 | 22 | 23 | 24 | 25 | 26 | 27 | 28 | 29 |
| Flame retardancy | Horizontal burning | ○ | ○ | ○ | ○ | ○ | ○ | ○ | ○ | ○ |
| Moldability | Fluidity | △ | ◎ | ◎ | ◎ | ◎ | ◎ | ◎ | ◎ | ◎ |
|  | Gas | ◎ | ◎ | ◎ | ◎ | ◎ | ◎ | ◎ | ◎ | ◎ |
| Surface appearance of molded article |  | X | ○ | ○ | ○ | ○ | ○ | ○ | ○ | ○ |
| Plating ability |  | ◎ | ◎ | ◎ | ◎ | ◎ | ◎ | ○ | ◎ | ◎ |
| Plate adhesion strength |  | ◎ | ◎ | ◎ | ◎ | ◎ | ◎ | ◎ | ○ | △ |
| Physical properties of plated product | Plating surface appearance | ○ | ◎ | ◎ | ○ | ◎ | ◎ | ◎ | ◎ | ◎ |
|  | Bend elastic constant (MPa) | 25000 | 15000 | 8000 | 15000 | 15000 | 15000 | 15000 | 14000 | 14000 |
|  | Thermal cycle property | ○ | ○ | ○ | ○ | ○ | ○ | ○ | ○ | ○ |

TABLE 13

|  |  | Example No. | | | | | | | | | |
|---|---|---|---|---|---|---|---|---|---|---|---|
|  |  | 30 | 31 | 32 | 33 | 34 | 35 | 36 | 37 | 38 | 39 |
| Flame retardancy | Vertical burning | △ | △ | △ | △ | △ | △ | △ | △ | △ | △ |
| Moldability | Fluidity | ◎ | ◎ | ◎ | ◎ | ◎ | ◎ | ◎ | ◎ | ◎ | ◎ |
|  | Gas | ◎ | ◎ | ◎ | ◎ | ◎ | ◎ | ◎ | ◎ | ◎ | ◎ |
| Surface appearance of molded article |  | ○ | ○ | ○ | ○ | ◎ | ◎ | ○ | ○ | ○ | ○ |
| Plating ability |  | ◎ | ◎ | ◎ | ◎ | ◎ | ◎ | ◎ | ◎ | ◎ | ◎ |
| Plate adhesion strength |  | ◎ | ◎ | ◎ | ◎ | ◎ | ◎ | ◎ | ◎ | ◎ | ◎ |
| Physical properties of | Plating surface appearance | ◎ | ◎ | ◎ | ◎ | ◎ | ◎ | ○ | ◎ | ◎ | ○ |

TABLE 13-continued

| | | Example No. | | | | | | | | | |
|---|---|---|---|---|---|---|---|---|---|---|---|
| | | 30 | 31 | 32 | 33 | 34 | 35 | 36 | 37 | 38 | 39 |
| plated product | Bend elastic constant (MPa) | 14000 | 14000 | 14000 | 14000 | 13500 | 13000 | 14000 | 14000 | 14000 | 14000 |
| | Thermal cycle property | ○ | ○ | ○ | ○ | ○ | ○ | ○ | ○ | ○ | ○ |

TABLE 14

| | | Example No. | | | | | | | | | |
|---|---|---|---|---|---|---|---|---|---|---|---|
| | | 40 | 41 | 42 | 43 | 44 | 45 | 46 | 47 | 48 | 49 |
| Flame retardancy | Vertical burning | ⊚ | ⊚ | ⊚ | ⊚ | ⊚ | ⊚ | ○ | ○ | ⊚ | ⊚ |
| Moldability | Fluidity | ⊚ | ⊚ | ⊚ | ⊚ | ⊚ | ⊚ | ○ | △ | ⊚ | ⊚ |
| | Gas | ⊚ | ⊚ | ⊚ | ⊚ | ⊚ | ⊚ | ⊚ | ⊚ | ⊚ | ⊚ |
| | Surface appearance of molded article | ○ | ○ | ○ | ○ | ⊚ | ⊚ | ○ | X | ○ | ○ |
| | Plating ability | ⊚ | ⊚ | ⊚ | ⊚ | ⊚ | ⊚ | ⊚ | ⊚ | ⊚ | ⊚ |
| | Plate adhesion strength | ⊚ | ⊚ | ⊚ | ⊚ | ⊚ | ⊚ | ⊚ | ⊚ | ⊚ | ⊚ |
| Physical properties of plated product | Plating surface appearance | ⊚ | ⊚ | ⊚ | ⊚ | ⊚ | ⊚ | ⊚ | ○ | ⊚ | ○ |
| | Bend elastic constant (MPa) | 14000 | 14000 | 14000 | 15000 | 14000 | 13500 | 21000 | 25000 | 15000 | 15000 |
| | Thermal cycle property | ○ | ○ | ○ | ○ | ○ | ○ | ○ | ○ | ○ | ○ |

TABLE 15

| | | Example No. | | | | | | | | | | |
|---|---|---|---|---|---|---|---|---|---|---|---|---|
| | | 50 | 51 | 52 | 53 | 54 | 55 | 56 | 57 | 58 | 59 | 60 |
| Flame retardancy | Vertical burning | ⊚ | ⊚ | ⊚ | △ | ⊚ | ⊚ | ⊚ | ⊚ | ⊚ | ⊚ | ⊚ |
| Moldability | Fluidity | ⊚ | ⊚ | ⊚ | ⊚ | ⊚ | ⊚ | ⊚ | ⊚ | ⊚ | ⊚ | ⊚ |
| | Gas | ⊚ | ⊚ | ⊚ | ⊚ | ⊚ | ⊚ | ⊚ | ⊚ | ⊚ | ⊚ | ⊚ |
| | Surface appearance of molded article | ○ | ○ | ○ | ⊚ | ○ | ⊚ | ⊚ | ○ | ⊚ | ⊚ | ○ |
| | Plating ability | ⊚ | ⊚ | ⊚ | ○ | ⊚ | ⊚ | ⊚ | ⊚ | ⊚ | ⊚ | ○ |
| | Plate adhesion strength | ⊚ | ⊚ | ⊚ | ⊚ | ⊚ | ⊚ | ⊚ | ⊚ | ⊚ | ⊚ | ⊚ |
| Physical properties of plated product | Plating surface appearance | ⊚ | ⊚ | ○ | ⊚ | ⊚ | ⊚ | ⊚ | ⊚ | ⊚ | ⊚ | ⊚ |
| | Bend elastic constant (MPa) | 15000 | 15000 | 15000 | 14000 | 14000 | 13500 | 13000 | 14000 | 13500 | 13000 | 14000 |
| | Thermal cycle property | ○ | ○ | ○ | ○ | ○ | ○ | ○ | ○ | ○ | ○ | ○ |

TABLE 16

| | | Example No. | | | | | | | |
|---|---|---|---|---|---|---|---|---|---|
| | | 61 | 62 | 63 | 64 | 65 | 66 | 67 | 68 |
| Flame retardancy | Vertical burning | ⊚ | ⊚ | ○ | ○ | ○ | ⊚ | ⊚ | ⊚ |
| Moldability | Fluidity | ⊚ | ⊚ | ⊚ | ⊚ | ⊚ | ⊚ | ⊚ | ⊚ |
| | Gas | ⊚ | ⊚ | ⊚ | ⊚ | ⊚ | X | X | X |
| | Surface appearance of molded article | ⊚ | ⊚ | ○ | ⊚ | ⊚ | ○ | ⊚ | ⊚ |
| | Plating ability | ○ | ○ | ○ | ○ | ○ | △ | △ | △ |
| | Plate adhesion strength | ⊚ | ⊚ | ⊚ | ⊚ | ⊚ | ⊚ | ⊚ | ⊚ |
| Physical properties of plated product | Plating surface appearance | ⊚ | ⊚ | ⊚ | ⊚ | ⊚ | ⊚ | ⊚ | ⊚ |

TABLE 16-continued

| | | Example No. | | | | | | | |
|---|---|---|---|---|---|---|---|---|---|
| | | 61 | 62 | 63 | 64 | 65 | 66 | 67 | 68 |
| plated product | Bend elastic constant (MPa) | 13500 | 13000 | 14000 | 13500 | 13000 | 14000 | 13500 | 13000 |
| | Thermal cycle property | ○ | ○ | ○ | ○ | ○ | ○ | ○ | ○ |

TABLE 17

| | | Comparative example No. | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Flame retardancy | Horizontal burning | ○ | X | ○ | X | ○ | ○ | ○ | ○ | ○ | — | ○ | ○ | ○ | ○ |
| Mold-ability | Fluidity | ◎ | Δ | ◎ | Δ | ◎ | ◎ | ◎ | ◎ | ◎ | X | ◎ | ◎ | ◎ | ◎ |
| | Gas | ◎ | ◎ | ◎ | ◎ | ◎ | ◎ | ◎ | ◎ | ◎ | — | ◎ | ◎ | ◎ | ◎ |
| Surface appearance of molded article | | ◎ | X | ◎ | X | ◎ | ◎ | ◎ | ◎ | ◎ | — | Δ | ◎ | ◎ | ◎ |
| Plating ability | | ○ | ◎ | ○ | ◎ | ◎ | ◎ | ◎ | ◎ | ◎ | — | ◎ | ◎ | ◎ | ○ |
| Plate adhesion strength | | X | X | X | X | X | X | X | X | ◎ | — | ◎ | ◎ | ◎ | X |
| Physical properties of plated product | Plating surface appearance | ◎ | ○ | ◎ | ○ | ◎ | ◎ | ◎ | ◎ | ◎ | — | X | X | X | ◎ |
| | Bend elastic constant (MPa) | 14000 | 13500 | 14000 | 13500 | 14000 | 13500 | 14000 | 13500 | 7000 | — | 14000 | 13500 | 13000 | 14000 |
| | Thermal cycle property | X X | X X | X X | X X | X X | X X | X X | X X | ○ | — | ○ | ○ | ○ | X |

As apparent from Tables 10 to 16, the reinforced resin compositions for plating bases of the examples 1 to 68 including the graft copolymer (A), the matrix polymer (B), the inorganic filler (D), and the glycidyl ether unit-containing polymer (E), in which the rubber polymer in the resin main component (C) had an average particle diameter of 0.1 to 0.6 μm and its content was from 5 to 25% by mass, excelled in all the flame retardancy, the moldability, the surface appearance of the molded article, the plating ability, the surface appearance of the plated product, the bend elastic constant, and the thermal cycle property.

On the other hand, as apparent from Table 17, the reinforced resin compositions for plating bases of the comparative examples 1 and 3 in which the content of the rubber polymer in the resin main component (C) was below 5% by mass, were inferior in the plating adhesion strength, and showed bulging of plating in the thermal cycle test.

The reinforced resin compositions for plating bases of the comparative examples 2 and 4 in which the content of the rubber polymer in the resin main component (C) was over 25% by mass, were inferior in the flame retardancy, the moldability, the surface appearance of the molded article, and the plating adhesion strength, and showed bulging of plating in the thermal cycle test.

The reinforced resin compositions for plating bases of the comparative examples 5 and 7 in which the average particle diameter of the rubber polymer in the resin main component (C) was below 0.1 μm, were inferior in the plating adhesion strength, and showed bulging of plating in the thermal cycle test.

The reinforced resin compositions for plating bases of the comparative examples 6 and 8 in which the average particle diameter of the rubber polymer in the resin main component (C) was over 0.6 μm, were inferior in the plating adhesion strength, and showed bulging of plating in the thermal cycle test.

The reinforced resin composition for plating bases of the comparative example 9, including the graft copolymer (A), the matrix polymer (B), and the glycidyl ether unit-containing polymer (E), but not including the inorganic filler (D) had low bend elastic constant.

The reinforced resin composition for plating bases of the comparative example 10 in which the content of the inorganic filler (D) was over 60 parts by mass was too low in the moldability to mold. For this reason, other evaluations were not feasible.

The reinforced resin compositions for plating bases of the comparative examples 11 to 13 including the graft copolymer (A), the matrix polymer (B), and the inorganic filler (D), but not including the glycidyl ether unit-containing polymer (E) were inferior in the surface appearance of the plated product.

The reinforced resin composition for plating bases of the comparative example 14 in which the content of the glycidyl ether unit-containing polymer (E) was over 20 parts by mass was inferior in the plating adhesion strength, and showed bulging of plating in the thermal cycle test.

INDUSTRIAL APPLICABILITY

The reinforced resin composition for plating bases of the present invention has excellent moldability, mechanical strengths, and plating ability, as well as being capable of improving the surface appearance of the molded article after plating.

The molded article of the present invention has excellent mechanical strengths, plating ability, and surface appearance after plating.

The electroplated component of the present invention has excellent mechanical strengths and surface appearance. For this reason, the present invention is useful as a housing of an electronic part of a laptop personal computer, a portable device, or the like.

What is claimed is:

1. An electroplated component comprising:
a molded article formed through molding processing of a reinforced resin composition for plating bases, and
a metal plating layer formed on at least a part of a surface of the molded article,
wherein
the reinforced resin composition for plating bases comprises:
10 to 60% by mass of a graft copolymer (A) in which a graft chain (A2) comprising an aromatic alkenyl compound monomer unit (a) and a vinyl cyanide compound monomer unit (b) is grafted to a rubber polymer (A1) having an average particle diameter of 0.1 to 0.6 μm;
40 to 90% by mass of a matrix polymer (B) which comprises one or more types of polymers selected from a group consisting of a vinyl-based copolymer (B-1) comprising an aromatic alkenyl compound monomer unit (a) and a vinyl cyanide compound monomer unit (b), a polycarbonate resin (B-2), and a polyester resin (B-3), with the proviso that, when the polycarbonate resin (B-2) is used, the matrix polymer (B) also includes at least one polymer selected from the group consisting of the vinyl-based copolymer (B-1) and the polyester resin (B-3);
0.1 to 60 parts by mass of an inorganic filler (D) relative to 100 parts by mass of a total amount of the graft copolymer (A) and the matrix polymer (B); and
2.0 to 14 parts by mass of a glycidyl ether unit-containing polymer (E) which comprises a glycidyl ether unit and which is a bisphenol A type epoxy resin having a main chain consisting of repetitive units represented by the following formula (1):

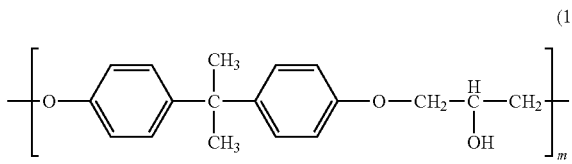

wherein m represents an integer of 1 or greater,
wherein a content of the rubber polymer (A1) is from 5 to 25% by mass of the total amount of the graft copolymer (A) and the matrix polymer (B).

2. The electroplated component according to claim 1, wherein a thickness of the metal plating layer is 5 μm or thicker.

3. The electroplated component according to claim 1, wherein the inorganic filler (D) is a carbon fiber.

4. The electroplated component according to claim 1, wherein the average thickness of the molded article is from 0.5 to 1.5 mm and the thickness of the metal plating layer is from 5 to 50 μm.

5. An electroplated component comprising:
a molded article formed through molding processing of a reinforced resin composition for plating bases, and
a metal plating layer formed on at least a part of a surface of the molded article,
wherein
the reinforced resin composition for plating bases comprises:
10 to 60% by mass of a graft copolymer (A) in which a graft chain (A2) comprising an aromatic alkenyl compound monomer unit (a) and a vinyl cyanide compound monomer unit (b) is grafted to a rubber polymer (A1) having an average particle diameter of 0.1 to 0.6 μm;
40 to 90% by mass of a matrix polymer (B) which comprises one or more types of polymers selected from a group consisting of a vinyl-based copolymer (B-1) comprising an aromatic alkenyl compound monomer unit (a) and a vinyl cyanide compound monomer unit (b), a polycarbonate resin (B-2), and a polyester resin (B-3), with the proviso that, when the polycarbonate resin (B-2) is used, the matrix polymer (B) also includes at least one polymer selected from the group consisting of the vinyl-based copolymer (B-1) and the polyester resin (B-3);
0.1 to 60 parts by mass of an inorganic filler (D) relative to 100 parts by mass of a total amount of the graft copolymer (A) and the matrix polymer (B);
2.0 to 14 parts by mass of a glycidyl ether unit-containing polymer (E) which comprises a glycidyl ether unit and which is a bisphenol A type epoxy resin having a main chain consisting of repetitive units represented by the following formula (1):

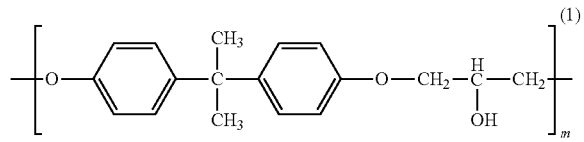

wherein m represents an integer of 1 or greater; and
0.1 to 40 parts by mass of a phosphate ester-based flame-retardant agent (F),
wherein a content of the rubber polymer (A1) is from 5 to 25% by mass of the total amount of the graft copolymer (A) and the matrix polymer (B).

6. The electroplated component according to claim 5, wherein a thickness of the metal plating layer is 5 μm or thicker.

7. The electroplated component according to claim 5, wherein a molecular weight of the phosphate ester-based flame-retardant agent (F) is higher than 326 and lower than 692.

8. The electroplated component according to claim 5, wherein the inorganic filler (D) is a carbon fiber.

9. The electroplated component according to claim 5, wherein the average thickness of the molded article is from 0.5 to 1.5 mm and the thickness of the metal plating layer is from 5 to 50 μm.

* * * * *